(12) United States Patent
Yamano et al.

(10) Patent No.: US 7,957,070 B2
(45) Date of Patent: Jun. 7, 2011

(54) ZOOM LENS AND IMAGING APPARATUS

(75) Inventors: Hiroki Yamano, Tokyo (JP); Daisuke Kuroda, Kanagawa (JP); Makoto Kanai, Tokyo (JP); Takumi Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 74 days.

(21) Appl. No.: 12/585,946

(22) Filed: Sep. 29, 2009

(65) Prior Publication Data

US 2010/0128363 A1    May 27, 2010

(30) Foreign Application Priority Data

Nov. 21, 2008   (JP) ................................ 2008-298523

(51) Int. Cl.
*G02B 15/14* (2006.01)
*H04N 5/262* (2006.01)

(52) U.S. Cl. ............... 359/682; 348/240.3; 359/680; 359/689

(58) Field of Classification Search ............... 348/240.3, 348/340; 359/680, 682, 689, 708
See application file for complete search history.

(56) References Cited

U.S. PATENT DOCUMENTS

| 7,880,974 B2* | 2/2011 | Matsui et al. ............... 359/682 |
| 2010/0060993 A1* | 3/2010 | Kanai et al. ............... 359/689 |
| 2010/0123958 A1* | 5/2010 | Hosoi et al. ............... 359/689 |
| 2010/0123959 A1* | 5/2010 | Kuroda et al. ............... 359/689 |
| 2010/0149657 A1* | 6/2010 | Kuroda ............... 359/689 |
| 2010/0157106 A1* | 6/2010 | Morooka ............... 348/240.3 |

FOREIGN PATENT DOCUMENTS

| JP | 2004-013169 |   | 1/2004 |
| JP | 2005-316333 | A | 11/2005 |
| JP | 2006-011096 | A | 1/2006 |
| JP | 2006-065182 | A | 3/2006 |
| JP | 2006-113554 |   | 4/2006 |
| JP | 2006-194974 | A | 7/2006 |
| JP | 2006-220715 | A | 8/2006 |
| JP | 2007-025373 | A | 2/2007 |
| JP | 2007-140359 |   | 6/2007 |
| JP | 2007-212636 |   | 8/2007 |
| JP | 2008-015433 | A | 1/2008 |
| JP | 2008-164724 | A | 7/2008 |
| JP | 2008-165143 | A | 7/2008 |
| JP | 2009-251371 | A | 10/2009 |
| JP | 2010-049189 | A | 3/2010 |
| JP | 2010-060903 | A | 3/2010 |

(Continued)

OTHER PUBLICATIONS

English-language translation of JP 2010-122625-A, Machine Translation obtained from IPDL Industrial Property Digital Library <http://www.ipdl.inpit.go.jp/homepg_e.ipdl> on Feb. 8, 2011.*

(Continued)

*Primary Examiner* — David N Spector
(74) *Attorney, Agent, or Firm* — Rader, Fishman & Grauer PLLC

(57) ABSTRACT

A zoom lens includes: first, second and third lens groups having negative refracting power, positive refracting power and positive refracting power, respectively, disposed in the order listed from an object side to an image side, wherein during zooming from a wide angle end to a telephoto end, the first lens group is moved and the second lens group is moved toward the object such that an air space between the first and second lens groups decreases and an air space between the second and third lens groups increases; and the first lens group is formed by first and second lenses, the first and second lenses being disposed in the order listed from the object side to the image side, and the zoom lens satisfying the following Conditional Expressions (1) and (2)

$$nd12 > 2.0 \quad (1)$$

$$vd12 < 21.6 \quad (2).$$

6 Claims, 25 Drawing Sheets

FOREIGN PATENT DOCUMENTS

JP     2010-091948 A     4/2010

OTHER PUBLICATIONS

English-language translation of "Selected JPO Prosecution documents" for priority basis 2008-298523, filed Nov. 21, 2008; obtained from USPTO/EAST Foreign Application Download Manager on Feb. 8, 2011.*

Japanese Office Action issued Aug. 26, 2010 for corresponding Japanese Application No. 2008-298523.

* cited by examiner

ZOOM LENS AND IMAGING APPARATUS

BACKGROUND OF THE INVENTION

1. Field of the Invention

The present invention relates to a zoom lens and an imaging apparatus. More specifically, the invention relates to the technical field of compact and high performance zoom lenses which can be advantageously used in imaging optical systems of digital input/output apparatus such as digital still cameras and digital video cameras and the technical field of imaging apparatus utilizing such zoom lenses.

2. Description of the Related Art

Recently, the market of imaging apparatus such as digital cameras has become very large, and users' requirements on imaging apparatus are becoming more diverse. In addition to demand for higher image quality, smaller sizes, and smaller thicknesses, demand for imaging lenses having greater zoom ratios and greater angles of view is becoming very strong recently.

There is great demand for greater angles of view and compactness, and it is particularly desirable to provide a compact zoom lens having a great zoom ratio and a great angle of view exceeding 40 deg in terms of half-angle of view.

For example, there are various types of zoom lenses to be used in digital still cameras, and the lens types listed below can be provided with a small size and a great angle of view.

Known lens types as described above include three-group zoom lenses formed by a first lens group having negative refracting power, a second lens group having positive refracting power, and a third lens group having positive refracting power, which are disposed in the order listed from an object side to an image side (for example, see JP-A-2004-13169 (Patent Document 1), JP-A-2006-113554 (Patent Document 2), JP-A-2007-212636 (Patent Document 3) and JP-A-2007-140359 (Patent Document 4)).

Referring to zoom lenses disclosed in Patent Documents 1 and 2, a first lens group is formed by three lenses to provide a great angle of view.

Zoom lenses disclosed in Patent Documents 3 and 4 are provided with a small size by forming a first lens group using two lenses, In particular, the zoom lens disclosed in Patent Document 4 is provided with a small size by forming a first lens group using two lenses and generating distortional aberrations in an active manner.

SUMMARY OF THE INVENTION

The first lens groups of the zoom lenses disclosed in Patent Documents 1 and 2 are formed by three lenses, and the zoom lenses have a great overall length in the direction of optical axes of the first lens groups. It is therefore incorrect to say that the approach is successful enough in achieving compactness.

In the case of zoom lens disclosed in Patent Document 3, compactness is achieved by forming the first lens group using two lenses, but the approach is not successful enough in achieving a great angle of view and a great zoom ratio. Specifically, the zoom lens has a half-angle of view of 40 deg or less and a zoom ratio lower than 3.8, and the zoom lens therefore does not satisfy recent demand for greater angles of view and greater zoom ratios.

In the case of the zoom lens disclosed in Patent Document 1, although compactness is achieved by generating distortional aberrations in an active manner, the zoom lens has a half-angle of view of about 30 deg and a zoom ratio of about 3.8. Therefore, the zoom lens is also unsuccessful in satisfying the recent demands for greater angles of view and greater zoom ratios.

Under such circumstances, it is desirable to provide a zoom lens and an imaging apparatus in which the above-described problems are solved to achieve compactness and high optical performance including a great angle of view and a high zoom ratio.

According to an embodiment of the invention, there is provided a zoom lens including a first lens group having negative refracting power, a second lens group having positive refracting power, and a third lens group having positive refracting power, disposed in the order listed from an object side to an image side. During zooming from a wide angle end to a telephoto end, the first lens group is moved and the second lens group is moved toward the object such that an air space between the first lens group and the second lens group decreases and such that an air space between the second lens group and the third lens group increases. The first lens group is formed by a first lens which is a negative lens aspherically shaped on both sides thereof and having a concave surface facing the object and a second lens which is a positive meniscus lens aspherically shaped on at least a side thereof facing the object and having a convex surface facing the object. The first and second lenses are disposed in the order listed from the object side to the image side. The zoom lens is configured to satisfy the following Conditional Expressions (1) and (2)

$$nd12 > 2.0 \tag{1}$$

$$vd12 < 21.6 \tag{2}$$

wherein $nd12$ represents the refractive index of the second lens of the first lens group measured using a d-ray, and $vd12$ represents the Abbe number of the second lens of the first lens group measured using a d-ray.

Thus, correction is satisfactorily performed on negative distortional aberrations and field curvature which occur at the wide angle end when the zoom lens has a great angle of view and spherical aberrations which occur at the telephoto end when the lens has a great zoom ratio.

Preferably, the above-descried zoom lens is configured to satisfy the following Conditional Expressions (3) and (4)

$$1.0 < |f12/f1| < 2.0 \tag{3}$$

$$0.6 < D1/fw < 1.5 \tag{4}$$

wherein $f12$ represents the focal length of the second lens of the first lens group; $f1$ represents the focal length of the first lens group; $D1$ represents the thickness of the first lens group measured on the optical axis thereof; and $fw$ represents the focal length of the entire lens system at the wide angle end.

When the zoom lens is configured to satisfy Conditional Expressions (3) and (4), the focal length of the second lens will not become too small, and the amounts of aberrations occurring at the second lens can be kept small. Further, the thickness of the first lens group will not become too large.

Preferably, the above-described zoom lens is configured to satisfy the following Conditional Expressions (5) and (6)

$$0.05 < (r21 - r12)/(r12 + r21) < 0.35 \tag{5}$$

$$0.55 < \{(|Sg21| + |Sg12|) \times 100\}/|f(AIR)| < 2.0 \tag{6}$$

wherein $r21$ represents a near-axis radius of curvature of the object-facing surface of the second lens in the first lens group; $r12$ represents a near-axis radius of curvature of the image-facing surface of the first lens in the first lens group; $f(AIR)$ represents the focal length of an air lens formed between the first lens and the second lens in the first lens group; $f(\Delta sag)$ represents the sag of the near-axis radius of curvature minus the sag of the aspheric shape; Sg21 represents the value f(Δsag) measured in the position of the effective aperture of the object-facing surface of the second lens in the first lens group; and Sg12 represents the value f(Δsag) measured in the position of the effective aperture of the image-facing surface of the first lens in the first lens group.

When the position of the effective aperture of the image-facing surface of the first lens is further than the radius r12, Sg12 represents the value f(Δsag) measured at the radial distance r12 from the optical axis of the lens.

When the zoom lens is configured to satisfy the Conditional Expressions (5) and (6), the aspherical shapes on both sides of the air lens formed between the first lens and the second lens are adequate for correcting various aberrations.

Preferably, the second lens group of the above-described zoom lens includes a third lens and a cemented lens disposed in the order listed from the object side to the image side. The third lens is a positive lens which is aspherically shaped on at least a side thereof facing the object and which has a convex surface facing the object. The cemented lens is formed by bonding a fourth lens which is a positive lens having a convex surface facing the object and a fifth lens which is a negative lens having a concave surface facing the image.

When the zoom lens is configured as described above, the second lens group can be formed by a smaller number of lenses, and a front-side principal point of the second lens group can be located closer to the object.

It is desirable to provide the above-described zoom lens with the function of correcting image blur by shifting the second lens group in a direction perpendicular to the optical axis thereof.

When the second lens group is shifted in a direction perpendicular to the optical axis thereof, image blur can be corrected by the lens group which has a smaller lens diameter and a smaller weight compared to other lens groups.

According to another embodiment of the invention, there is provided an imaging apparatus including a zoom lens and an imaging element converting an optical image formed by the zoom lens into an electrical signal. The zoom lens includes a first lens group having negative refracting power, a second lens group having positive refracting power, and a third lens group having positive refracting power, disposed in the order listed from an object side to an image side. During zooming from a wide angle end to a telephoto end, the first lens group is moved and the second lens group is moved toward the object such that an air space between the first lens group and the second lens group decreases and such that an air space between the second lens group and the third lens group increases. The first lens group is formed by a first lens which is a negative lens aspherically shaped on both sides thereof and having a concave surface facing the object and a second lens which is a positive meniscus lens aspherically shaped on at least a side thereof facing the object and having a convex surface facing the object. The first and second lenses are disposed in the order listed from the object side to the image side. The imaging apparatus satisfying the following Conditional Expressions (1) and (2)

$$nd12>2.0 \tag{1}$$

$$vd12<21.6 \tag{2}$$

wherein nd12 represents the refractive index of the second lens of the first lens group measured using a d-ray, and vd12 represents the Abbe number of the second lens of the first lens group measured using a d-ray.

Thus, correction is satisfactorily performed on negative distortional aberrations and field curvature which occur at the wide angle end when the zoom lens has a great angle of view and spherical aberrations which occur at the telephoto end when the lens has a great zoom ratio.

The zoom lens according to the embodiment of the invention includes a first lens group having negative refracting power, a second lens group having positive refracting power, and a third lens group having positive refracting power, disposed in the order listed from an object side to an image side. During zooming from a wide angle end to a telephoto end, the first lens group is moved and the second lens group is moved toward the object such that an air space between the first lens group and the second lens group decreases and such that an air space between the second lens group and the third lens group increases. The first lens group is formed by a first lens which is a negative lens aspherically shaped on both sides thereof and having a concave surface facing the object and a second lens which is a positive meniscus lens aspherically shaped on at least a side thereof facing the object and having a convex surface facing the object. The first and second lenses are disposed in the order listed from the object side to the image side. The zoom lens is configured to satisfy the following Conditional Expressions (1) and (2)

$$nd12>2.0 \tag{1}$$

$$vd12<21.6 \tag{2}$$

wherein nd12 represents the refractive index of the second lens of the first lens group measured using a d-ray, and vd12 represents the Abbe number of the second lens of the first lens group measured using a d-ray.

Thus, the zoom lens can be made small while achieving high optical performance including a great angle of view and a great zoom ratio.

According to one preferred configuration described above, the zoom lens is configured to satisfy the following Conditional Expressions (3) and (4)

$$1.0<|f12/f1|<2.0 \tag{3}$$

$$0.6<D1/fw<1.5 \tag{4}$$

wherein f12 represents the focal length of the second lens of the first lens group; f1 represents the focal length of the first lens group; D1 represents the thickness of the first lens group measured on the optical axis thereof; and fw represents the focal length of the entire lens system at the wide angle end.

Thus, the zoom lens can be made compact by keeping an overall optical length thereof small while achieving high optical performance.

According to another preferred configuration described above, the zoom lens is configured to satisfy the following Conditional Expressions (5) and (6)

$$0.05<(r21-r12)/(r12+r21)<0.35 \tag{5}$$

$$0.55<\{(|Sg21|+|Sg12|)\times100\}/|f(AIR)|<2.0 \tag{6}$$

wherein r21 represents a near-axis radius of curvature of the object-facing surface of the second lens in the first lens group; r12 represents a near-axis radius of curvature of the image-facing surface of the first lens in the first lens group; f(AIR) represents the focal length of an air lens formed between the first lens and the second lens in the first lens group; f(Δsag) represents the sag of the near-axis radius of curvature minus the sag of the aspheric shape; Sg21 represents the value f(Δsag) measured in the position of the effective aperture of the object-facing surface of the second lens in the first lens group; and Sg12 represents the value f(Δsag) measured in the position of the effective aperture of the image-facing surface of the first lens in the first lens group.

When the position of the effective aperture of the image-facing surface of the first lens is further than the radius r12, Sg12 represents the value f(Δsag) measured at the radial distance r12 from the optical axis of the lens.

Thus, the optical system can be provided with a small size and a great angle of view while achieving a satisfactory aberration-correcting effect. In addition, the lens barrel can be manufactured with ease.

According to still another preferred configuration described above, the second lens group of the above-described zoom lens includes a third lens and a cemented lens disposed in the order listed from the object side to the image side. The third lens is a positive lens which is aspherically shaped on at least a side thereof facing the object and which has a convex surface facing the object. The cemented lens is formed by bonding a fourth lens which is a positive lens having a convex surface facing the object and a fifth lens which is a negative lens having a concave surface facing the image.

Thus, the zoom lens can be provided with a small overall optical length, and spherical aberrations and coma aberrations can be satisfactorily corrected.

According to yet another preferred configuration described above, the zoom lens is provided with the function of correcting image blur by shifting the second lens group in a direction perpendicular to the optical axis thereof.

Thus, the size and power consumption of the zoom lens can be kept small.

According to further another preferred configuration described above, there is provided an imaging apparatus including a zoom lens and an imaging element converting an optical image formed by the zoom lens into an electrical signal. The zoom lens includes a first lens group having negative refracting power, a second lens group having positive refracting power, and a third lens group having positive refracting power, disposed in the order listed from an object side to an image side. During zooming from a wide angle end to a telephoto end, the first lens group is moved and the second lens group is moved toward the object such that an air space between the first lens group and the second lens group decreases and such that an air space between the second lens group and the third lens group increases. The first lens group is formed by a first lens which is a negative lens aspherically shaped on both sides thereof and having a concave surface facing the object and a second lens which is a positive meniscus lens aspherically shaped on at least a side thereof facing the object and having a convex surface facing the object. The first and second lenses are disposed in the order listed from the object side to the image side. The imaging apparatus satisfying the following Conditional Expressions (1) and (2)

$$nd12>2.0 \quad (1)$$

$$vd12<21.6 \quad (2)$$

wherein nd12 represents the refractive index of the second lens of the first lens group measured using a d-ray, and vd12 represents the Abbe number of the second lens of the first lens group measured using a d-ray.

Thus, the imaging apparatus can be provided with a small size while achieving high optical performance including a great angle of view and a great zoom ratio.

BRIEF DESCRIPTION OF THE DRAWINGS

FIG. 2 shows a spherical aberration, an astigmatic aberration, and a distortional aberration observed when the lens is set at a wide angle end;

FIG. 6 shows a spherical aberration, anastigmatic aberration, and a distortional aberration observed when the lens of the second embodiment is set at a wide angle end;

FIG. 10 shows a spherical aberration, anastigmatic aberration, and a distortional aberration observed when the lens of the third embodiment is set at a wide angle end;

FIG. 14 shows a spherical aberration, anastigmatic aberration, and a distortional aberration observed when the lens of the fourth embodiment is set at a wide angle end;

FIG. 18 shows a spherical aberration, anastigmatic aberration, and a distortional aberration observed when the lens of the fifth embodiment is set at a wide angle end;

FIG. 22 shows a spherical aberration, an astigmatic aberration, and a distortional aberration observed when the lens of the sixth embodiment is set at a wide angle end;

DETAILED DESCRIPTION OF THE INVENTION

Figure 1:
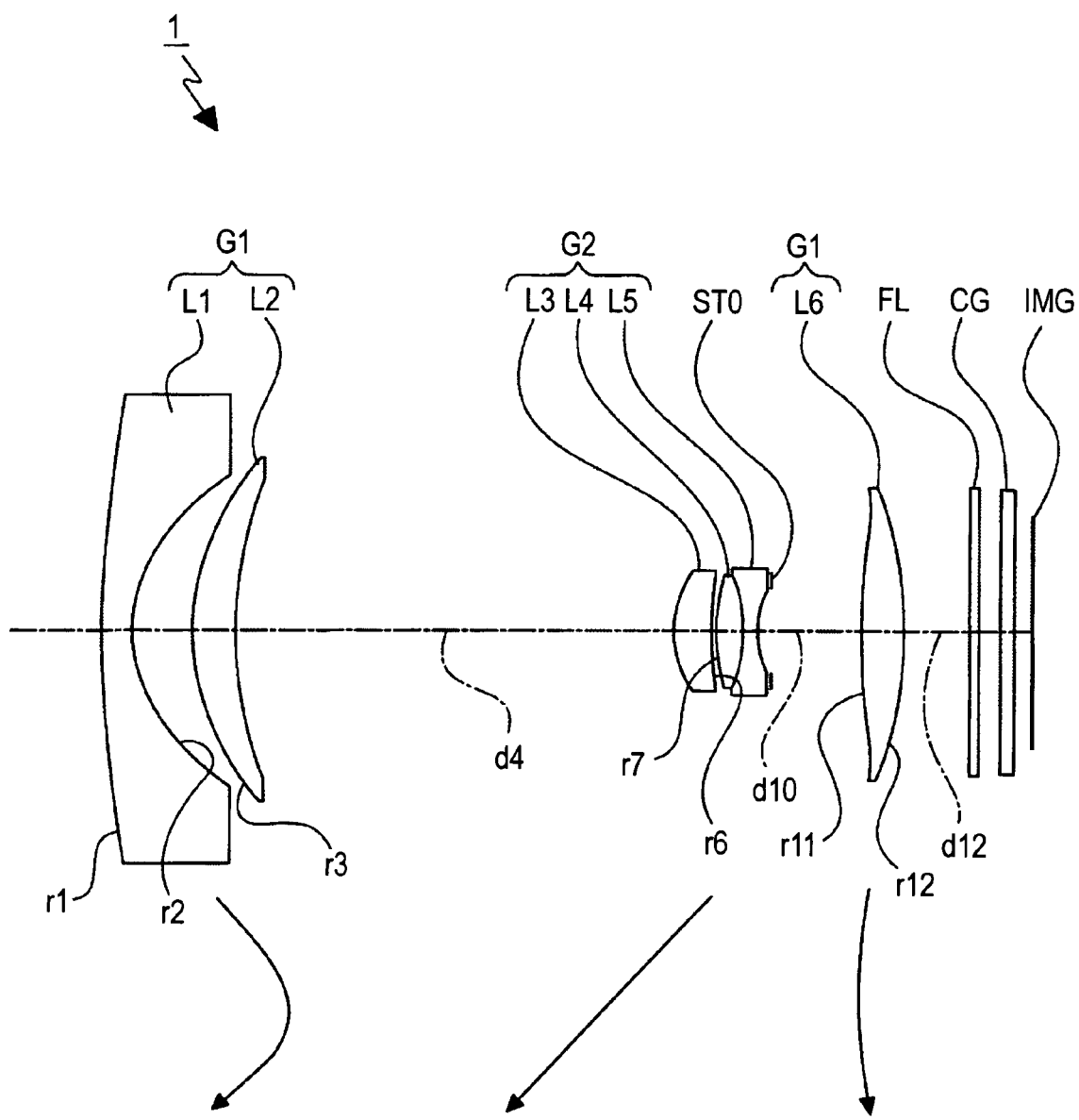
FIG. 1 is an illustration showing a configuration of a first embodiment of a zoom lens according to the invention.

Embodiments of zoom lenses and an imaging apparatus according to the invention will now be described.

First, a zoom lens according to one embodiment of the invention will be described.

The zoom lens according to this embodiment of the invention includes a first lens group having negative refracting power, a second lens group having positive refracting power, and a third lens group having positive refracting power, disposed in the order listed from an object side to an image side.

During zooming from the wide angle to the telephoto end of the zoom lens, the first lens group is moved in a direction along the optical axis thereof and the second lens group is moved along the optical axis thereof toward the object such that the air space between the first lens group and the second lens group decreases and such that the air space between the second lens group and the third lens group increases.

The first lens group is formed by a first lens which is a negative lens aspherically shaped on both sides thereof and having a concave surface facing the image and a second lens which is a positive meniscus lens aspherically shaped on at least a side thereof facing the object and having a convex surface facing the object. Those lenses are disposed in the order listed from the object side to the image side.

The zoom lens according to the embodiment of the invention is configured to satisfy the following Conditional Expressions (1) and (2)

$$nd12 > 2.0 \qquad (1)$$

$$vd12 < 21.6 \qquad (2)$$

wherein nd12 represents the refractive index of the second lens in the first lens group measured using a d-ray, and vd12 represents the Abbe number of the second lens in the first lens group measured using a d-ray.

In the zoom lens according to the embodiment of the invention, the first lens that is a negative lens included in the first lens group is aspherically shaped on both sides thereof. It is therefore possible to correct negative distortional aberrations and field curvature which can become noticeable at the wide angle end when the lens has a great angle of view.

The second lens that is a positive meniscus lens included in the first lens group is formed with an aspheric surface at least on a side thereof facing an object. It is therefore possible to correct a distortional aberration and an astigmatic aberration at the wide angle end which can not be completely corrected by the first lens, in a well-balanced manner. Since the second lens that is a positive meniscus lens included in the first lens group is aspherically shaped on at least a side thereof facing the object, it is possible to satisfactorily correct spherical aberrations occurring at the telephoto end when the lens has a great zoom ratio.

Thus, the zoom lens according to the embodiment of the invention can be provided with a small size and high optical performance including a great angle of view and a great zoom ratio because the first lens group is formed by two lenses and because both sides of the first lens and at least one side of the second lens facing the object are aspherically shaped.

Especially, when the zoom lens according to the embodiment of the invention is used in a retractable imaging apparatus having an expandable lens barrel, the overall length of the apparatus in a retracted state thereof can be kept small.

Conditional Expressions (1) and (2) are conditional expressions defining the refractive index and Abbe number of the second lens which is a positive lens forming part of the first lens group.

When the refractive index is in the excess of the range defined by Conditional Expression (1), it is desirable to increase the curvature of the second lens. Otherwise, degradation of optical performance may be caused by difficulty in correcting field curvature at the wide angle end, and difficulty will be encountered in manufacturing a lens barrel because of difficulty in maintaining a sufficient edge thickness.

When the Abbe number is in the excess of the range defined by Conditional Expression (2), it is difficult to correct chromatic aberrations occurring at the first lens group, which results in degradation of optical performance.

Therefore, when the zoom lens satisfies Conditional Expressions (1) and (2), the lens can be provided with improved optical performance, and the lens barrel can be manufactured with ease.

Preferably, the zoom lens according to the embodiment of the invention is configured to satisfy the following Conditional Expressions (3) and (4)

$$1.0 < |f12/f1| < 2.0 \qquad (3)$$

$$0.6 < D1/fw < 1.5 \qquad (4)$$

wherein f12 represents the focal length of the second lens of the first lens group; f1 represents the focal length of the first lens group; D1 represents the thickness of the first lens group measured on the optical axis thereof; and fw represents the focal length of the entire lens system at the wide angle end.

Conditional Expression (3) is an expression defining the ratio of the focal length of the second lens of the first lens group to the focal length of the first lens group.

When the lower limit value of Conditional Expression (3) is exceeded, the focal length of the second lens is too short, and there is a need for increasing the thickness of the second lens, which can hinder size reduction. Further, since the second lens becomes highly sensitive to decentering because of aberrations having great magnitudes generated at the same, mass-productivity will be reduced.

When the upper limit value of Conditional Expression (3) is exceeded, the focal length of the second lens is too great, which makes it difficult to correct aberrations, in particular, field curvature at the wide angle end.

Therefore, when the zoom lens satisfies Conditional Expression (3), high mass-productivity can be achieved through reduction in sensitivity to decentering, and aberrations, in particular, field curvature at the wide angle end can be satisfactorily corrected.

Conditional Expression (4) is an expression defining the thickness of the first lens group measured on the optical axis thereof relative to the focal length of the entire lens system at the wide angle end.

When the lower limit value of Conditional Expression (4) is exceeded, excessively great off-axis aberrations occur, and it is difficult to correct aberrations, in particular, astigmatic aberrations at the wide angle end. Thus, optical performance is degraded.

When the upper limit value of Conditional Expression (4) is exceeded, the first lens group has a great thickness which can be an obstacle in the way of keeping the entire lens system small.

Therefore, when the zoom lens satisfies Conditional Expression (4), astigmatic aberrations can be satisfactorily corrected to achieve improved optical performance, and the entire lens system can be provided with a small size.

When Conditional Expressions (3) and (4) are satisfied, the overall optical length of the zoom lens can be kept small to allow the lens to be made compact while achieving high optical performance.

Preferably, the zoom lens according to the embodiment of the invention is configured to satisfy the following Conditional Expressions (5) and (6)

$$0.05 < (r21-r12)/(r12+r21) < 0.35 \quad (5)$$

$$0.55 < \{(|Sg21|+|Sg12|) \times 100\}/|f(AIR)| < 2.0 \quad (6)$$

wherein r21 represents a near-axis radius of curvature of the object-facing surface of the second lens in the first lens group; r12 represents a near-axis radius of curvature of the image-facing surface of the first lens in the first lens group; f(AIR) represents the focal length of an air lens formed between the first lens and the second lens in the first lens group; f($\Delta$sag) represents the sag of the near-axis radius of curvature minus the sag of the aspheric shape; Sg21 represents the value f($\Delta$sag) measured in the position of the effective aperture of the object-facing surface of the second lens in the first lens group; and Sg12 represents the value f($\Delta$sag) measured in the position of the effective aperture of the image-facing surface of the first lens in the first lens group.

When the position of the effective aperture of the image-facing surface of the first lens is further than the radius r12, Sg12 represents the value f($\Delta$sag) measured at the radial distance r12 from the optical axis of the lens.

Conditional Expression (5) is an expression defining the shape of an air lens formed between the first lens and the second lens of the first lens group.

When the lower limit value of Conditional Expression (5) is exceeded, the curvature of a lens surface of the air lens is too great, and the refracting power of the lens surface is therefore too small. Thus, it is difficult to make the optical system compact. When the lower limit value of Conditional Expression (5) is exceeded, light rays entering the air lens from the object side are likely to have too great angles of incidence in the neighborhood of the extremities of the angle of view. Therefore, difficulty will be encountered in correcting off-axis aberrations when the lens is provided with a great angle of view.

When the upper limit value of Conditional Expression (5) is exceeded, since the curvature of the lens surface of the air lens is too small, off-axis aberrations and axial aberrations are likely to occur at the wide angle end and the telephoto end, respectively. Further, since it is difficult to maintain a sufficient edge thickness and to keep sensitivity to decentering sufficiently low, productivity will be low when manufacturing lens barrels.

Therefore, when the zoom lens satisfies Conditional Expression (5), the optical system can be provided with a small size and a great angle of view, and lens barrels can be manufactured with high productivity since sensitivity to decentering can be kept low.

Conditional Expression (6) is an expression defining a relationship between the aspheric shapes formed on the image-facing side of the first lens of the first lens group and the object-facing side of the second lens and the refracting power of the air lens formed between the first lens and the second lens of the first lens group.

When the lower limit value of Conditional Expression (6) is exceeded, aspheric shapes on both sides of the air lens formed between the first lens and the second lens have high similarity to spherical lenses, and the aspheric lens is therefore less effective in correcting off-axis aberrations. Thus, there will be excessively large off-axis aberrations, and it is difficult to correct such aberrations, in particular, astigmatic aberrations at the wide angle end. The zoom lens therefore has low optical performance.

When the upper limit value of Conditional Expression (6) is exceeded, aberrations are overcorrected by the aspheric shapes, and it is therefore difficult to correct aberrations at the first lens group properly. In addition, the lens barrel is difficult to manufacture because it has high sensitivity to decentering.

Therefore, when the zoom lens satisfies Conditional Expression (6), the correcting effect of the aspheric lens can be properly achieved, and sensitivity to decentering can be kept low to facilitate manufacture of the lens barrel.

Preferably, the second lens group of the zoom lens according to the present embodiment includes a third lens and a cemented lens disposed in the order listed from the object side to the image side. The third lens is a positive lens which is aspherically shaped on at least a side thereof facing the object and which has a convex surface facing the object. The cemented lens is formed by bonding a fourth lens which is a positive lens having a convex surface facing the object and a fifth lens which is a negative lens having a concave surface facing the image.

In such a configuration of the second lens group, the second lens group can be formed by a small number of lenses to provide the lens group with a small overall length. Since a front-side principal point of the second lens group can be located close to the object, the overall optical length of the zoom lens can be kept small. Further, since the surface of the second lens group closest to the object is aspherically shaped, spherical aberrations and coma aberrations can be satisfactorily corrected.

An image formed by the zoom lens according to the embodiment of the invention can be shifted by moving (shifting) one of the first to third lens groups or a part of the lens group in a direction substantially perpendicular to the optical axis thereof. Such a function of allowing a lens group or a part of the lens group to be moved in a direction substantially perpendicular to the optical axis thereof can be combined with a detection system for detecting image blur, a driving system for shifting each lens group, and a control system for supplying a shift amount to the driving system based on an output from the detection system. Thus, the zoom lens can be provided with the function of an anti-vibration optical system.

Preferably, the zoom lens according to the embodiment of the invention has the function of correcting image blur by shifting the second lens group in a direction perpendicular to the optical axis thereof.

An image can be shifted with small aberrational fluctuations by shifting the second lens group in a direction perpendicular to the optical axis thereof. Since the second lens group has smaller lens diameters and therefore has a smaller weight compared to the other lens groups, the size and power consumption of the zoom lens can be kept smaller by using the second lens group as a lens group for correcting image blur.

Preferably, the focusing of the zoom lens according to the embodiment of the invention is performed by moving the first lens group or third lens group in a direction along the optical axis thereof. More particularly, it is preferable to use the third lens group as a lens group for focusing in order to achieve compactness because the lens group can be more easily prevented from interfering with a driving system for driving and controlling a shutter unit or an iris unit and an anti-vibration driving system for shifting a lens group.

Embodiments of the zoom lens according to the invention and examples of numerical values used in the embodiments will now be specifically described with reference to the drawings and tables.

Symbols used in the following tables and description have meanings as described below.

"si" represents a surface number assigned to a surface in an i-th place counted from the object side to the image side. "ri" represents a near-axis radius of curvature of the surface in the i-th place (i-th surface). "di" represents an axial surface distance between the i-th surface and a surface in an (i+1)-th place. "ni" represents the refractive index of the material of the lens including the i-th surface measured using a d-ray (having a wavelength of 587.6 nm). "vi" represents the Abbe number of the material of the lens including the i-th surface measured using the d-ray. A surface number accompanied by "ASP" indicates that the surface of interest is aspheric. Similarly, "STO" represents a stop, and "IMG" represents an image plane. A radius of curvature accompanied by "INFINITY" indicates that the radius of curvature of the surface of interest is infinity.

Lenses used for describing example of numerical values include lenses having aspherically shaped lens surfaces. An aspheric shape is defined by Equation 1 shown below.

$$x = \frac{cy^2}{1 + \{1 - (1+K) \cdot c^2 \cdot y^2\}^{1/2}} + Ay^4 + By^6 + \ldots$$

In Expression 1, "x" represents the distance of the shape from an apex of a lens surface in a direction along the optical axis; "y" represents the height of the shape in a direction perpendicular to the optical axis; "c" represents a near-axis curvature at the apex of the lens (the inverse of the radius of curvature); "K" represents a conic constant; and "A", "B", and so on represent aspheric coefficients.

First to sixth embodiments of the invention will now be described. Any of zoom lenses according to the first to sixth embodiments of the invention includes a first lens group having negative refracting power, a second lens group having positive refracting power, and a third lens group having positive refracting power, which are disposed in the order listed from an object side to an image side. When any of the zoom lenses according to the first to sixth embodiments of the invention zooms from the wide angle end to the telephoto end, the first lens group is moved and the second lens group is moved toward the object such that an air space between the first lens group and the second lens group decreases and such that an air space between the second lens group and the third lens group increases.

FIG. 1 is an illustration showing a configuration of a zoom lens 1 according to the first embodiment of the invention.

As showing in FIG. 1, the zoom lens 1 of the first embodiment includes six lenses.

The zoom lens 1 includes a first lens group G1 having negative refracting power, a second lens group G2 having positive refracting power, and a third lens group G3 having positive refracting power which are disposed in the order listed from the object side to the image side.

The first lens group G1 includes a first lens L1 and a second lens L2 disposed in the order listed from the object side to the image side. The first lens is a negative lens which is aspherically shaped on both sides thereof and which includes a concave surface facing the image. The second lens is a positive meniscus lens which is aspherically shaped on a side thereof facing the object and which includes a convex surface facing the object.

The second lens group G2 includes a third lens L3 and a cemented lens which are disposed in the order listed from the object side to the image side. The third lens is a positive lens which is aspherically shaped on a side thereof facing the image and which includes a convex surface facing the object. The cemented lens is formed by bonding a fourth lens L4 which is a positive lens aspherically shaped on a side thereof facing the object and including a convex surface facing the object and a fifth lens L5 which is a negative lens having a concave surface facing the image.

The third lens group G3 is constituted by a sixth lens L6 which is a double convex lens aspherically shaped on both sides thereof.

A stop STO (a stop surface r10) is disposed between the second lens group G2 and the third lens group G3.

Between the third lens group G3 and an image plane IMG, a filter FL and a cover glass CG are disposed in the order listed from the object side to the image side.

Table 1 shows lens data which is Example 1 of specific numerical values used in the zoom lens 1 according to the first embodiment of the invention.

TABLE 1

| si | ri | di | ni | vi |
|---|---|---|---|---|
| 1 (ASP) | 26.948 | 1.015 | 1.85135 | 40.100 |
| 2 (ASP) | 5.025 | 2.078 | | |
| 3 (ASP) | 9.028 | 1.467 | 2.00178 | 19.300 |
| 4 | 14.495 | (d4) | | |
| 5 | 4.011 | 1.270 | 1.58313 | 59.461 |
| 6 (ASP) | 36.995 | 0.150 | | |
| 7 (ASP) | 7.837 | 0.980 | 1.88300 | 40.805 |
| 8 | −4.800 | 0.400 | 1.68893 | 31.159 |
| 9 | 3.171 | 0.600 | | |
| 10 (STO) | INFINITY | (d10) | | |
| 11 (ASP) | 29.633 | 1.479 | 1.55332 | 71.680 |
| 12 (ASP) | −12.459 | (d12) | | |
| 13 | INFINITY | 0.300 | 1.51680 | 64.198 |
| 14 | INFINITY | 0.720 | | |
| 15 | INFINITY | 0.500 | 1.56883 | 56.044 |
| 16 | INFINITY | 0.600 | | |
| IMG | INFINITY | | | |

In the zoom lens 1, an object-facing surface (r1) of the first lens L1 of the first lens group G1, an image-facing surface (r2) of the first lens L1 of the first lens group G1, an object-facing surface (r3) of the second lens L2 of the first lens group G1, an image-facing surface (r6) of the third lens L3 of the second lens group G2, an object-facing surface (r7) of the fourth lens L4 of the second lens group G2, an object-facing surface (r11) of the sixth lens L6 of the third lens group G3, and an image-facing surface (r12) of the sixth lens L6 of the third lens group G3 are aspherically shaped. Table 2 shows fourth-order aspheric coefficients A, sixth-order aspheric coefficients B, eighth-order aspheric coefficients C, and tenth-order aspheric coefficients D of the aspheric surfaces associated with Example 1 of numerical values along with conic constants K.

In Table 2 and each of tables showing aspheric coefficients which will be described later, notation "E-i" represents a base-10 exponential or stands for "$10^{-i}$". For example, "0.12345E−05" stands for "$0.12345 \times 10^{-5}$".

TABLE 2

| si | K | A | B | C | D |
|---|---|---|---|---|---|
| 1 | 0.00000E+00 | −2.73965E−04 | 4.46180E−06 | −3.76920E−08 | 1.48904E−10 |
| 2 | −8.65416E−01 | 9.19596E−05 | −8.65513E−07 | −7.37560E−08 | 7.92032E−09 |
| 3 | −1.58868E−01 | 1.40679E−04 | −5.81779E−06 | 9.17721E−08 | 1.40137E−09 |
| 6 | 9.70958E−01 | −1.82291E−03 | 1.40764E−04 | −3.77918E−05 | 5.37748E−06 |
| 7 | −6.95987E+02 | 5.39517E−03 | 2.27203E−04 | −1.66459E−06 | 1.58137E−05 |
| 11 | 0.00000E+00 | 7.60052E−04 | −6.12010E−05 | 8.30759E−07 | 0.00000E+00 |
| 12 | 0.00000E+00 | 1.72998E−03 | −1.02623E−04 | 1.94532E−06 | −1.07668E−08 |

During zooming of the zoom lens 1 between the wide angle end and the telephoto end, changes occur in a surface distance d4 between the first lens group G1 and the second lens group G2, a surface distance d10 between the stop STO and the third lens group G3, and a surface distance d12 between the third lens group G3 and the filter FL. Table 3 shows the amounts of changes in each surface distance that can occur when the lens having numerical values of Example 1 is set at the wide angle end (at a focal length f of 4.08), when the lens is set at an intermediate focal length (at a focal length f of 8.46), and when the lens is set at the telephoto end (at a focal length f of 17.50). The amounts of changes are shown along with F-numbers Fno and half-angles of view ω.

TABLE 3

| f | 4.08 | 8.46 | 17.50 |
|---|---|---|---|
| Fno | 2.83 | 4.0 | 5.95 |
| ω | 45.08 | 25.79 | 13.16 |
| d4 | 15.200 | 4.734 | 0.300 |
| d10 | 3.038 | 7.144 | 16.910 |
| d12 | 1.543 | 1.791 | 1.800 |

Figure 2:
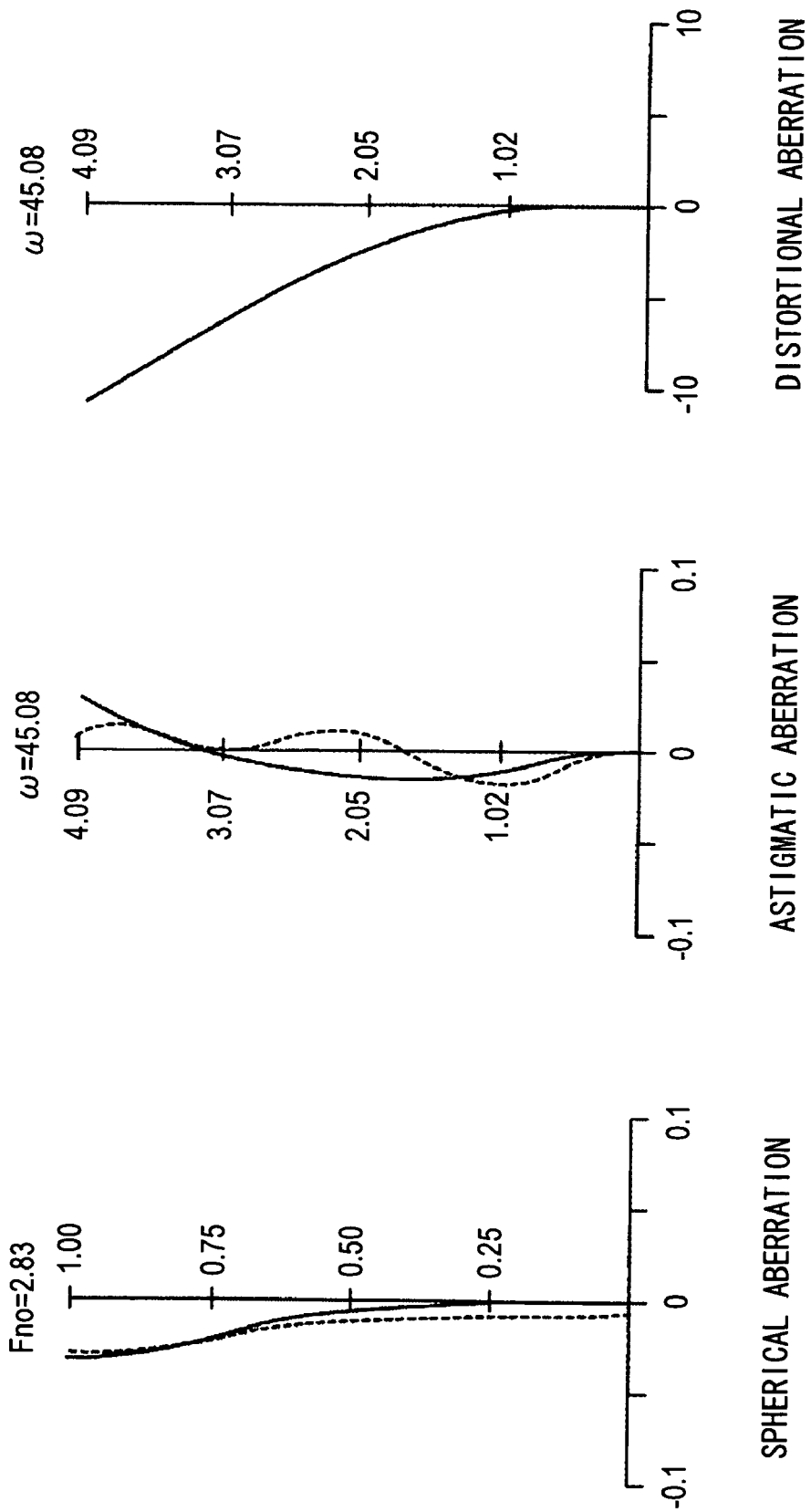
FIG. 2 is aberration diagrams obtained using an example of specific numerical values applied to the first embodiment.
Figure 3:
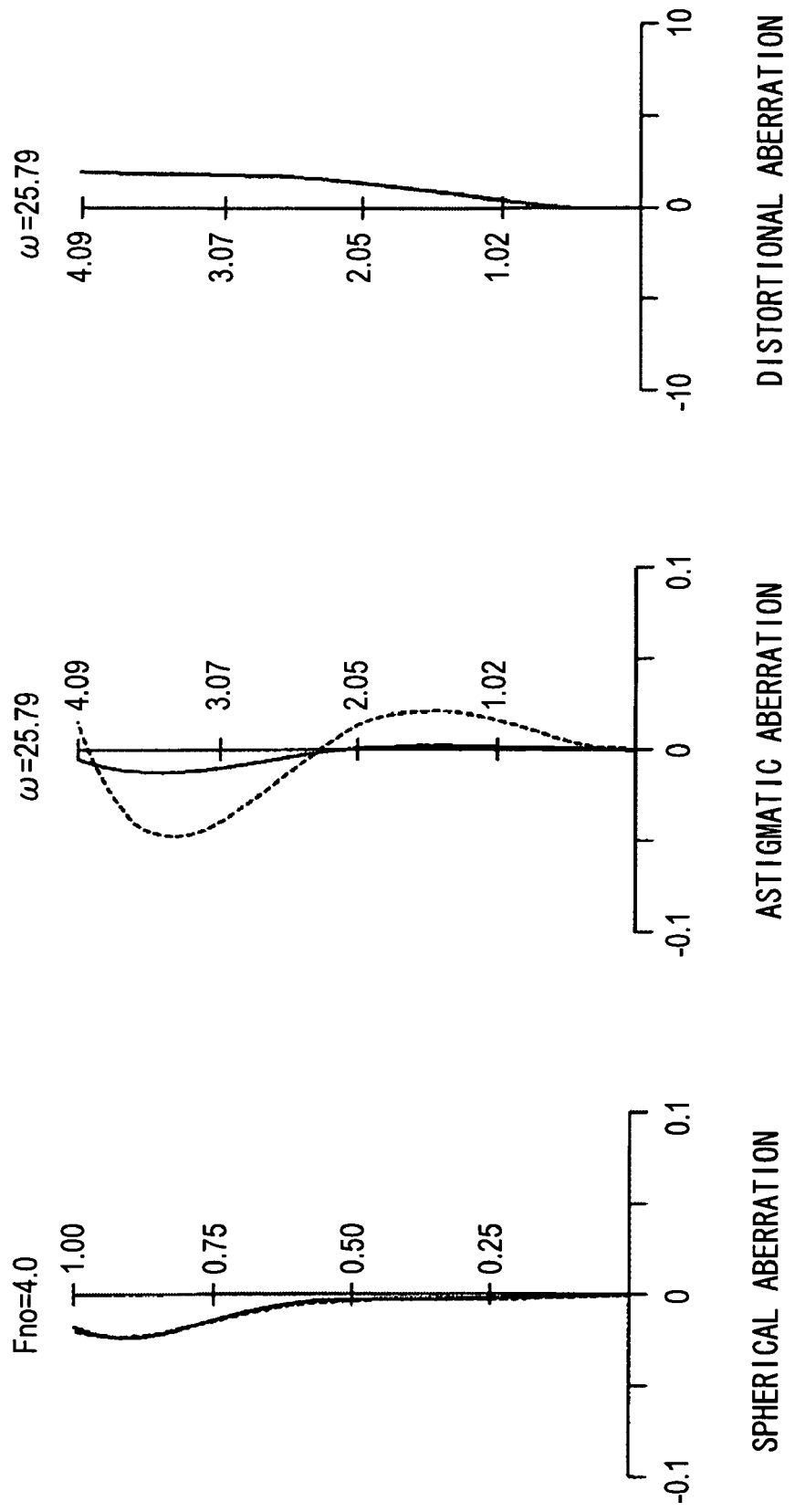
FIG. 3 shows a spherical aberration, an astigmatic aberration, and a distortional aberration observed when the lens of the first embodiment is set at an intermediate focal length.
Figure 4:
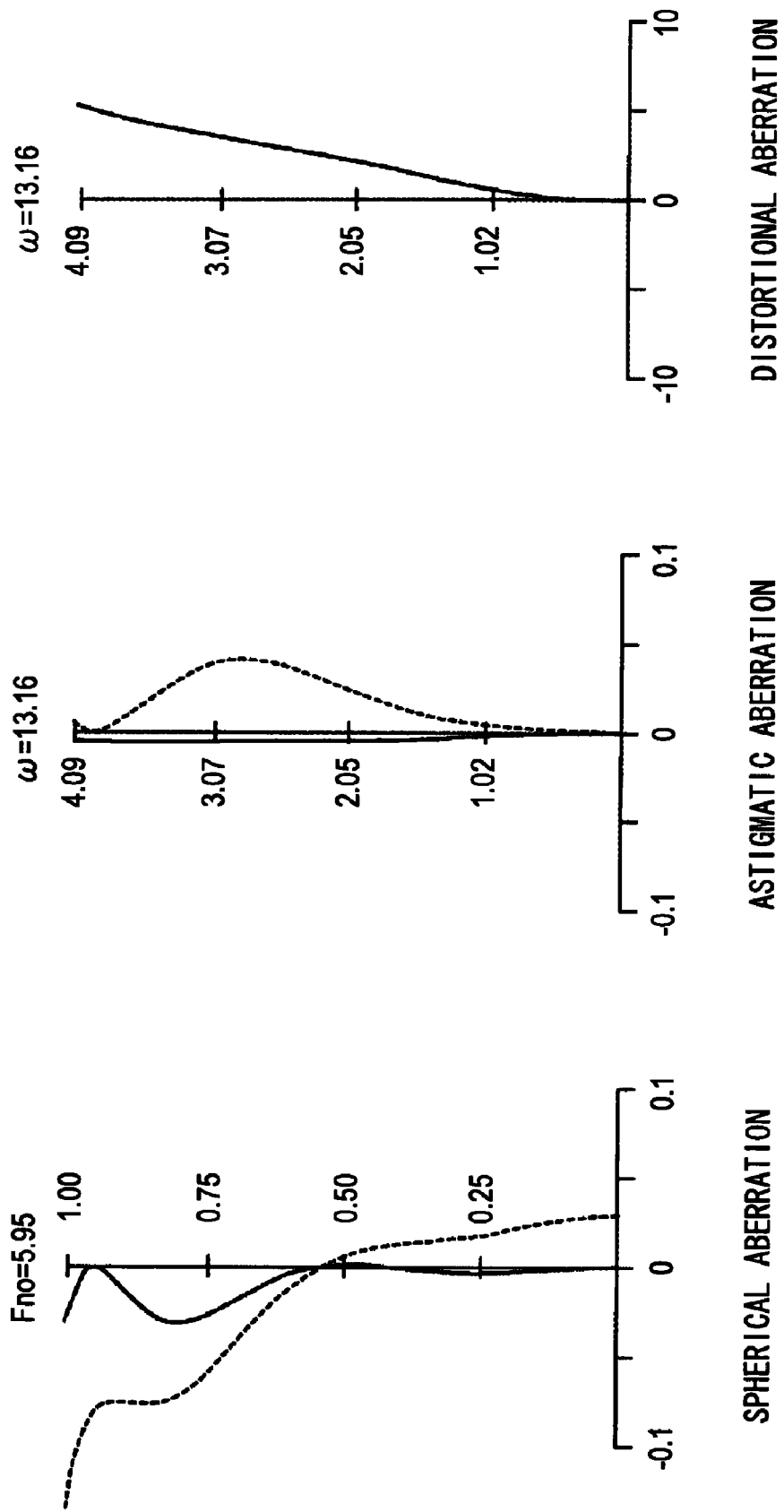
FIG. 4 shows a spherical aberration, an astigmatic aberration, and a distortional aberration observed when the lens of the first embodiment is set at a telephoto end.

FIGS. 2 to 4 show various aberrations encountered when the lens having numerical values of Example 1 is focused at infinity. FIG. 2 shows aberrations encountered when the lens is set at the wide angle end (at the focal length f of 4.08). FIG. 3 shows aberrations encountered when the lens is set at the intermediate focal length (at the focal length f of 8.46). FIG. 4 shows aberrations encountered when the lens is set at the telephoto end (at the focal length f of 17.50).

In the spherical aberration diagrams shown in FIGS. 2 to 4, solid lines represent values measured using a d-ray (having a wavelength of 587.6 nm), and broken lines represent values measured using a g-ray (having a wavelength of 435.8 nm). In the astigmatic aberration diagrams shown in FIGS. 2 to 4, solid lines represent values measured on a sagittal plane, and broken lines represent values measured on a meridional plane.

It is obvious from the aberration diagrams that aberrations can be satisfactorily corrected to achieve high imaging performance by the numerical values of Example 1.

Figure 5:
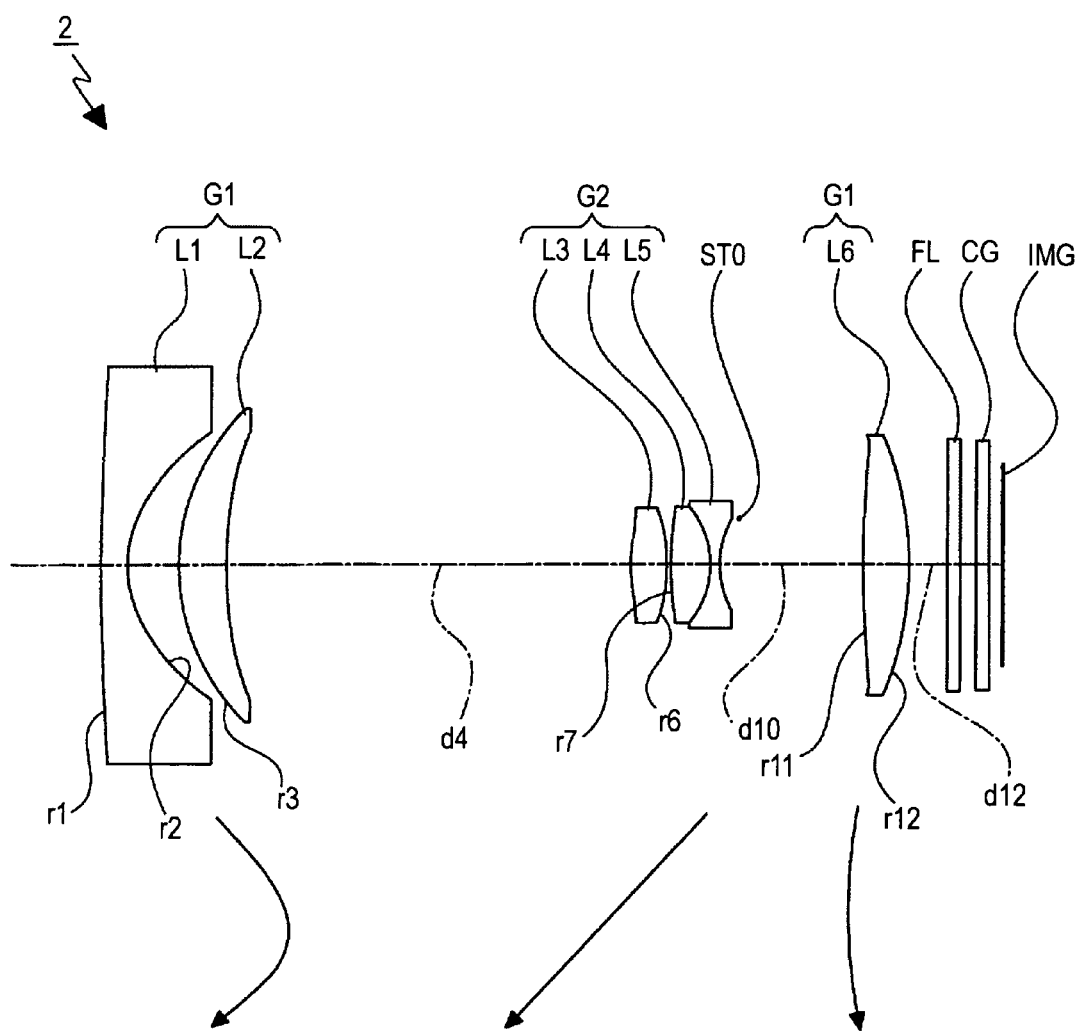
FIG. 5 is an illustration showing a configuration of a second embodiment of a zoom lens according to the invention.

FIG. 5 is an illustration showing a configuration of a zoom lens 2 according to a second embodiment of the invention.

As shown in FIG. 5, the zoom lens 2 of the second embodiment includes six lenses.

The zoom lens 2 includes a first lens group G1 having negative refracting power, a second lens group G2 having positive refracting power, and a third lens group G3 having positive refracting power which are disposed in the order listed from the object side to the image side.

The first lens group G1 includes a first lens L1 and a second lens L2 disposed in the order listed from the object side to the image side. The first lens is a negative lens which is aspherically shaped on both sides thereof and which includes a concave surface facing the image. The second lens is a positive meniscus lens which is aspherically shaped on a side thereof facing the object and which includes a convex surface facing the object.

The second lens group G2 includes a third lens L3 and a cemented lens which are disposed in the order listed from the object side to the image side. The third lens is a positive lens which is aspherically shaped on a side thereof facing the image and which includes a convex surface facing the object. The cemented lens is formed by bonding a fourth lens L4 which is a positive lens aspherically shaped on a side thereof facing the object and including a convex surface facing the object and a fifth lens L5 which is a negative lens having a concave surface facing the image.

The third lens group G3 is constituted by a sixth lens L6 which is a double convex lens aspherically shaped on both sides thereof.

A stop STO (a stop surface r10) is disposed between the second lens group G2 and the third lens group G3.

Between the third lens group G3 and an image plane IMG, a filter FL and a cover glass CG are disposed in the order listed from the object side to the image side.

Table 4 shows lens data which is Example 2 of specific numerical values used in the zoom lens 2 according to the second embodiment of the invention.

TABLE 4

| si | ri | di | ni | vi |
|---|---|---|---|---|
| 1 (ASP) | 98.584 | 1.000 | 1.85135 | 40.100 |
| 2 (ASP) | 5.101 | 2.000 | | |
| 3 (ASP) | 9.137 | 1.750 | 2.00178 | 19.300 |
| 4 | 16.575 | (d4) | | |
| 5 | 6.757 | 1.365 | 1.58313 | 59.461 |
| 6 (ASP) | −9.746 | 0.150 | | |
| 7 (ASP) | 13.474 | 1.485 | 1.88300 | 40.805 |
| 8 | −3.940 | 0.400 | 1.67270 | 32.170 |
| 9 | 3.515 | 0.800 | | |
| 10 (STO) | INFINITY | (d10) | | |
| 11 (ASP) | 45.435 | 1.670 | 1.59201 | 67.020 |
| 12 (ASP) | −12.356 | (d12) | | |
| 13 | INFINITY | 0.300 | 1.51680 | 64.198 |
| 14 | INFINITY | 0.700 | | |
| 15 | INFINITY | 0.500 | 1.56883 | 56.044 |
| 16 | INFINITY | 0.500 | | |
| IMG | INFINITY | | | |

In the zoom lens 2, an object-facing surface (r1) of the first lens L1 of the first lens group G1, an image-facing surface (r2) of the first lens L1 of the first lens group G1, an object-facing surface (r3) of the second lens L2 of the first lens group G1, an image-facing surface (r6) of the third lens L3 of the second lens group G2, an object-facing surface (r7) of the fourth lens L4 of the second lens group G2, an object-facing surface (r11) of the sixth lens L6 of the third lens group G3, and an image-facing surface (r12) of the sixth lens L6 of the third lens group G3 are aspherically shaped. Table 5 shows fourth-order aspheric coefficients A, sixth-order aspheric coefficients B, eighth-order aspheric coefficients C, and tenth-order aspheric coefficients D of the aspheric surfaces associated with Example 2 of numerical values along with conic constants K.

TABLE 5

| si | K | A | B | C | D |
|---|---|---|---|---|---|
| 1 | 0.00000E+00 | −1.27569E−04 | 4.65164E−06 | −7.00059E−08 | 3.86147E−10 |
| 2 | −2.42970E+00 | 1.57501E−03 | −2.50475E−05 | 8.21533E−07 | −9.97383E−09 |
| 3 | 0.00000E+00 | 3.15153E−05 | −3.06213E−07 | 1.81260E−08 | 4.44673E−10 |
| 6 | 0.00000E+00 | −3.73459E−03 | −4.02494E−04 | 1.03531E−05 | −6.80686E−06 |
| 7 | 0.00000E+00 | −1.40546E−03 | −2.75852E−04 | −2.42874E−06 | −2.44169E−06 |
| 11 | 0.00000E+00 | 5.64551E−04 | −9.73504E−05 | 5.79416E−06 | −1.25533E−07 |
| 12 | 0.00000E+00 | 1.69357E−03 | −1.74785E−04 | 9.26587E−06 | −1.82365E−07 |

During zooming of the zoom lens 2 between the wide angle end and the telephoto end, changes occur in a surface distance d4 between the first lens group G1 and the second lens group G2, a surface distance d10 between the stop STO and the third lens group G3, and a surface distance d12 between the third lens group G3 and the filter FL. Table 6 shows the amounts of changes in each surface distance that can occur when the lens having the numerical values of Example 2 is set at the wide angle end (at a focal length f of 4.08), when the lens is set at an intermediate focal length (at a focal length f of 8.45), and when the lens is set at the telephoto end (at a focal length f of 17.50). The amounts of changes are shown along with F-numbers Fno and half-angles of view ω.

TABLE 6

| f | 4.08 | 8.45 | 17.50 |
|---|---|---|---|
| Fno | 2.83 | 4.0 | 5.94 |
| ω | 45.08 | 25.83 | 13.16 |
| d4 | 15.400 | 5.439 | 0.800 |
| d10 | 4.700 | 9.232 | 19.280 |
| d12 | 2.255 | 2.563 | 1.700 |

Figure 6:
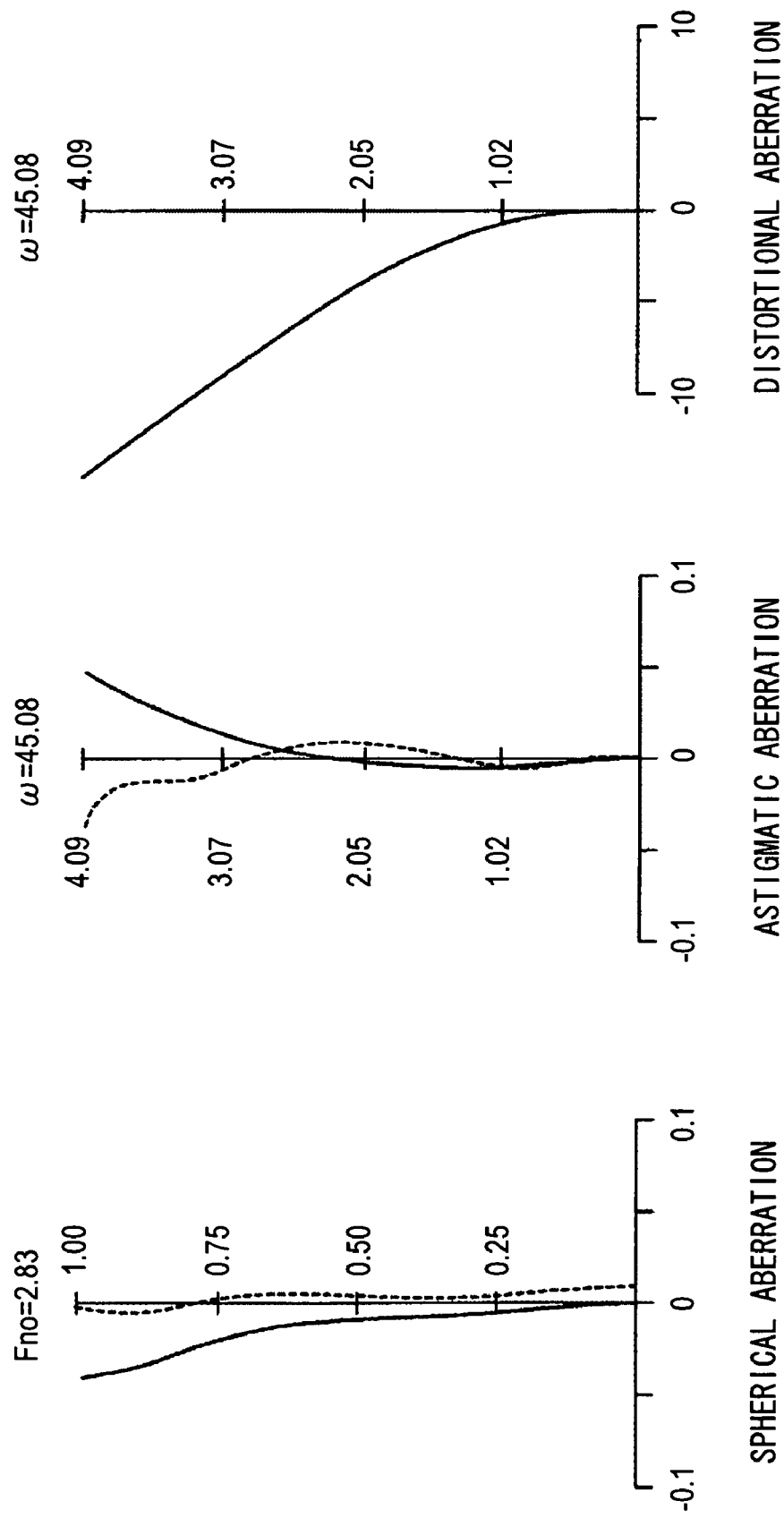
FIG. 6 is aberration diagrams obtained using an example of specific numerical values applied to the second embodiment.
Figure 7:
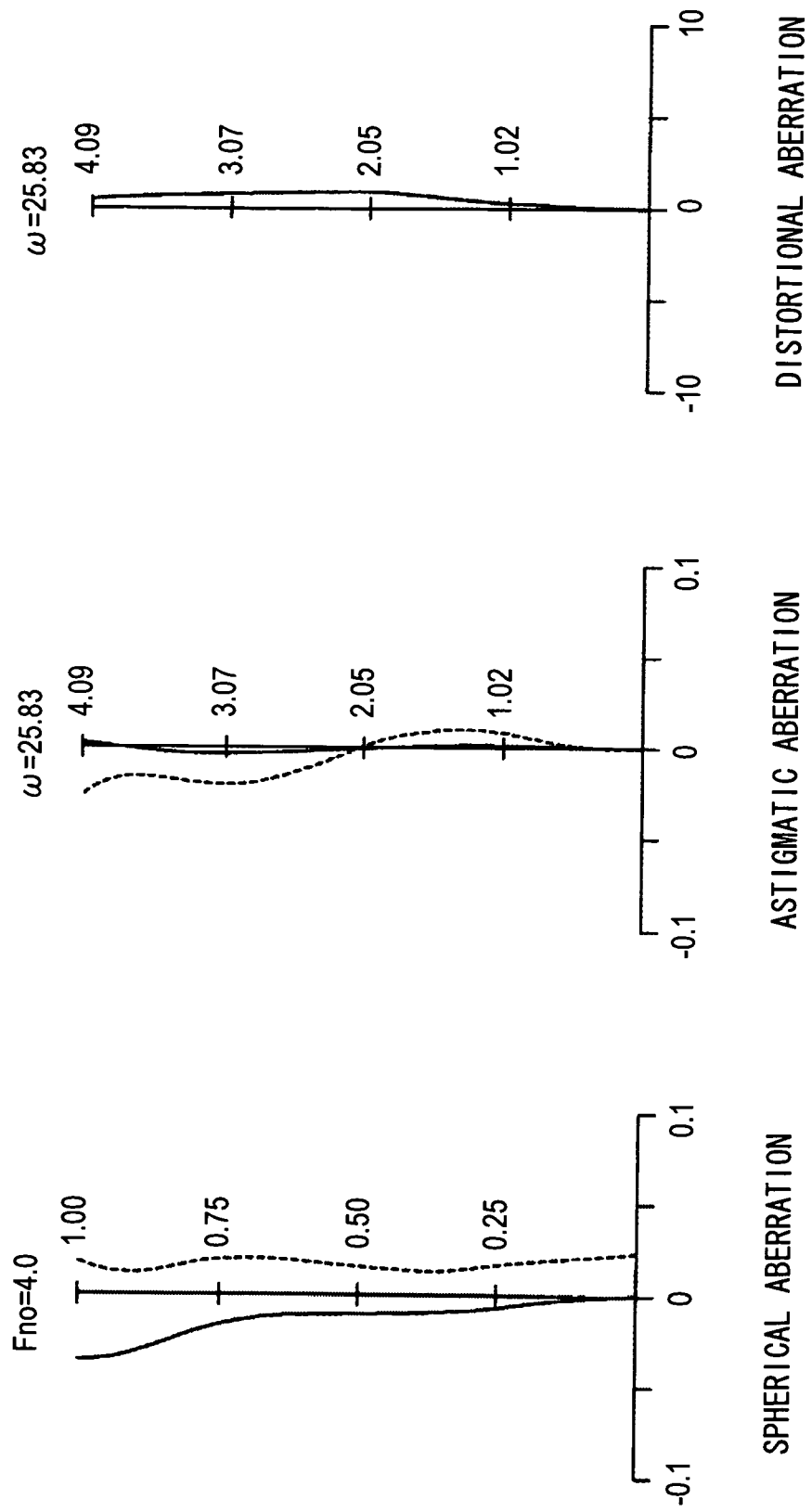
FIG. 7 shows a spherical aberration, an astigmatic aberration, and a distortional aberration observed when the lens of the second embodiment is set an intermediate focal length.
Figure 8:
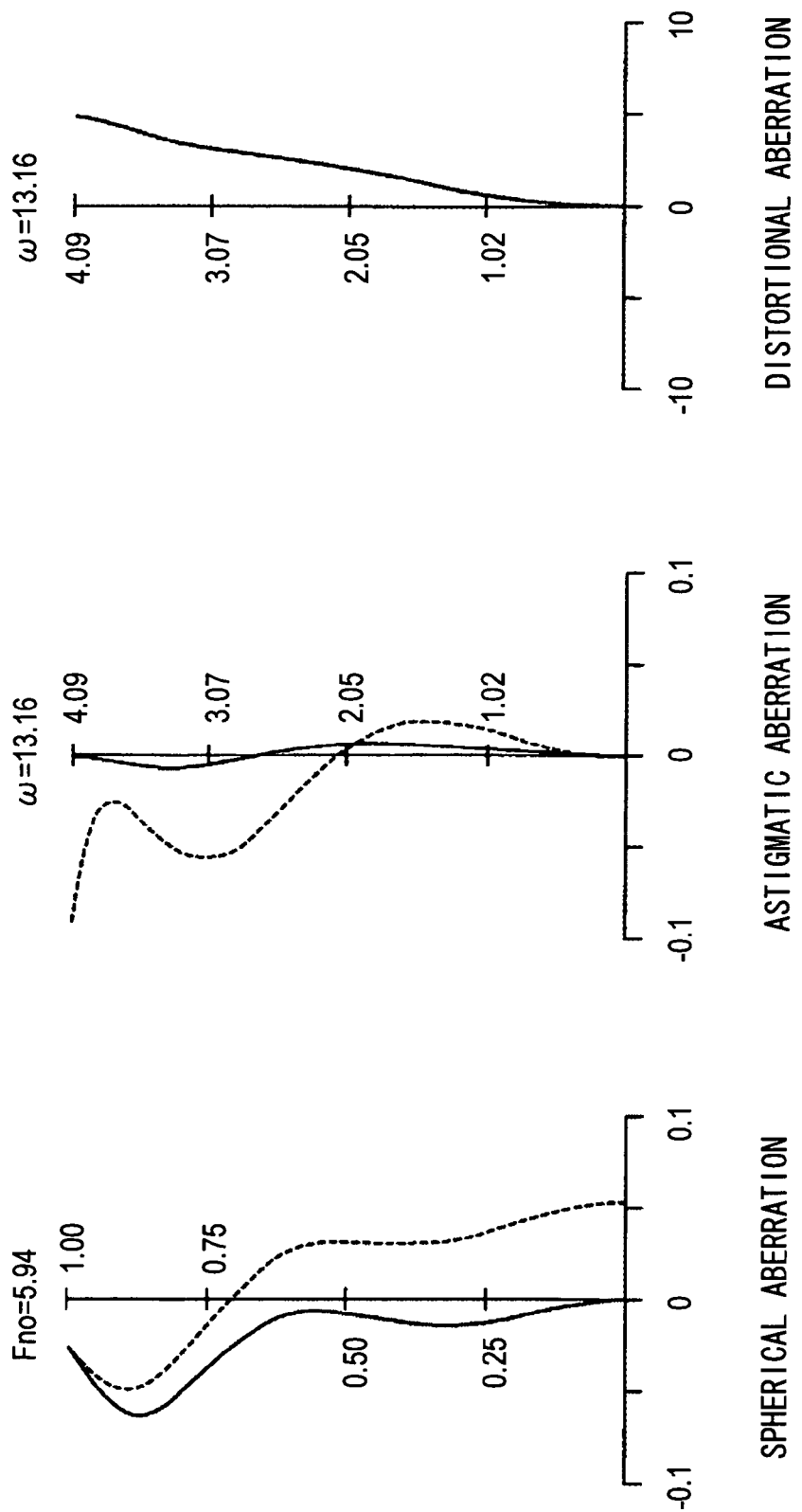
FIG. 8 shows a spherical aberration, an astigmatic aberration, and a distortional aberration observed when the lens of the second embodiment is set at a telephoto end.

FIGS. 6 to 8 show various aberrations encountered when the lens having the numerical values of Example 2 is focused at infinity. FIG. 6 shows aberrations encountered when the lens is set at the wide angle end (at the focal length f of 4.08). FIG. 7 shows aberrations encountered when the lens is set at the intermediate focal length (at the focal length f of 8.45). FIG. 8 shows aberrations encountered when the lens is set at the telephoto end (at the focal length f of 17.50).

In the spherical aberration diagrams shown in FIGS. 6 to 8, solid lines represent values measured using a d-ray (having a wavelength of 587.6 nm), and broken lines represent values measured using a g-ray (having a wavelength of 435.8 nm). In the astigmatic aberration diagrams shown in FIGS. 6 to 8, solid lines represent values measured on a sagittal plane, and broken lines represent values measured on a meridional plane.

It is obvious from the aberration diagrams that aberrations can be satisfactorily corrected to achieve high imaging performance by the numerical values of Example 2.

Figure 9:
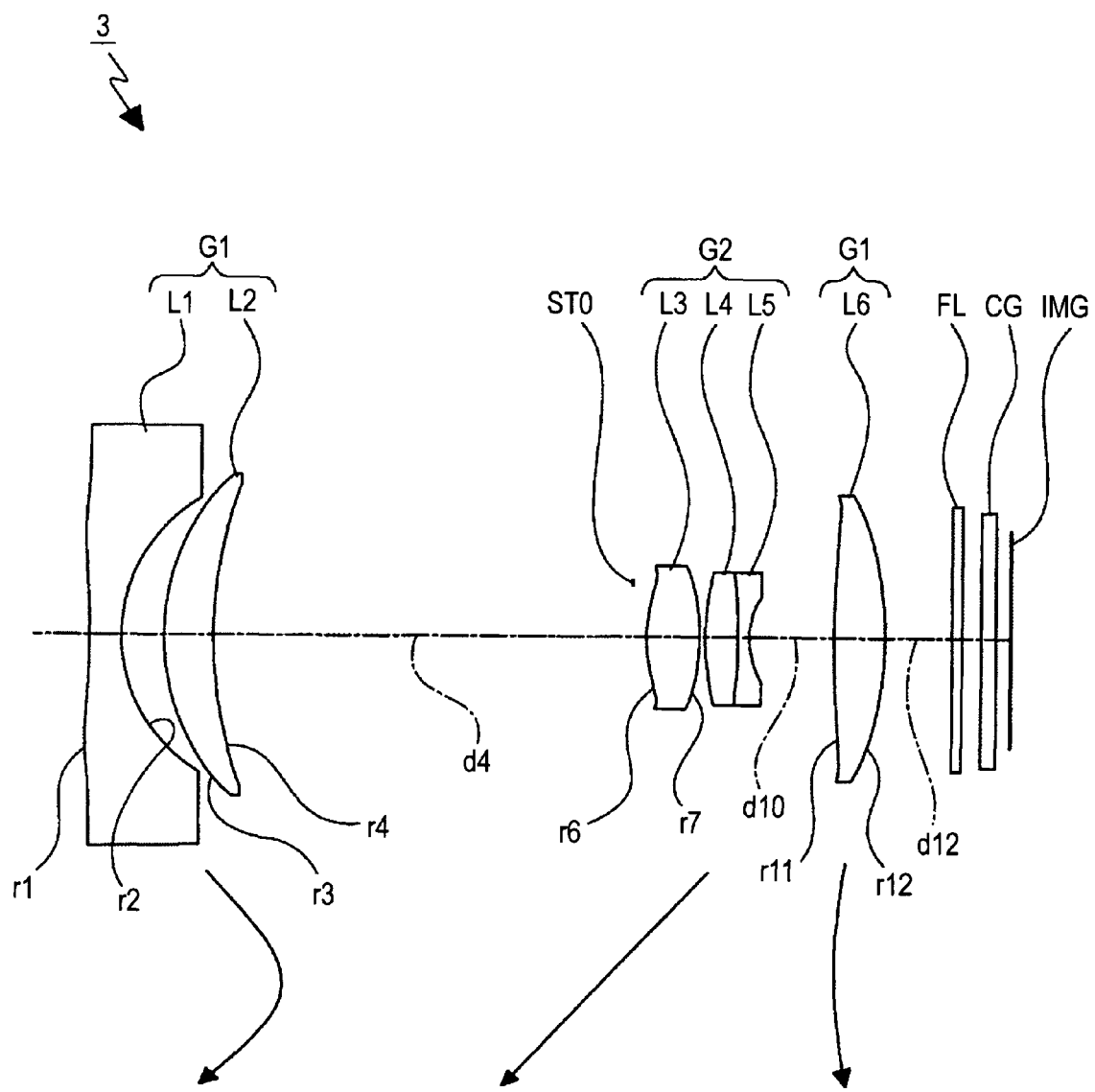
FIG. 9 is an illustration showing a configuration of a third embodiment of a zoom lens according to the invention.

FIG. 9 is an illustration showing a configuration of a zoom lens 3 according to a third embodiment of the invention.

As shown in FIG. 9, the zoom lens 3 of the third embodiment includes six lenses.

The zoom lens 3 includes a first lens group G1 having negative refracting power, a second lens group G2 having positive refracting power, and a third lens group G3 having positive refracting power which are disposed in the order listed from the object side to the image side.

The first lens group G1 includes a first lens L1 and a second lens L2 disposed in the order listed from the object side to the image side. The first lens is a negative lens which is aspherically shaped on both sides thereof and which includes a concave surface facing the image. The second lens is a positive meniscus lens which is aspherically shaped on both sides thereof and which includes a convex surface facing the object.

The second lens group G2 includes a third lens L3 and a cemented lens which are disposed in the order listed from the object side to the image side. The third lens is a positive lens which is aspherically shaped on both sides thereof and which includes a convex surface facing the object. The cemented lens is formed by bonding a fourth lens L4 which is a positive lens having a convex surface facing the object and a fifth lens L5 which is a negative lens having a concave surface facing the image.

The third lens group G3 is constituted by a sixth lens L6 which is a double convex lens aspherically shaped on both sides thereof.

A stop STO (a stop surface r5) is disposed between the first lens group G1 and the second lens group G2.

Between the third lens group G3 and an image plane IMG, a filter FL and a cover glass CG are disposed in the order listed from the object side to the image side.

Table 7 shows lens data which is Example 3 of specific numerical values used in the zoom lens 3 according to the third embodiment of the invention.

TABLE 7

| si | ri | di | ni | vi |
|---|---|---|---|---|
| 1 (ASP) | −21.176 | 1.100 | 1.85135 | 40.100 |
| 2 (ASP) | 6.371 | 1.591 | | |
| 3 (ASP) | 7.316 | 1.812 | 2.00170 | 20.644 |
| 4 (ASP) | 13.417 | (d4) | | |
| 5 (STO) | INFINITY | 0.500 | | |
| 6 (ASP) | 5.619 | 1.934 | 1.62263 | 58.200 |
| 7 (ASP) | −9.097 | 0.166 | | |
| 8 | 9.907 | 1.200 | 1.83481 | 42.700 |
| 9 | −22.955 | 0.400 | 1.72825 | 28.300 |
| 10 | 3.365 | (d10) | | |
| 11 (ASP) | 72.285 | 1.809 | 1.69350 | 53.200 |
| 12 (ASP) | −11.429 | (d12) | | |
| 13 | INFINITY | 0.300 | 1.51872 | 64.200 |
| 14 | INFINITY | 0.720 | | |
| 15 | INFINITY | 0.500 | 1.51872 | 64.200 |
| 16 | INFINITY | 0.600 | | |
| IMG | INFINITY | | | |

In the zoom lens 3, an object-facing surface (r1) of the first lens L1 of the first lens group G1, an image-facing surface (r2) of the first lens L1 of the first lens group G1, an object-facing surface (r3) of the second lens L2 of the first lens group G1, an image-facing surface (r4) of the second lens L2 of the first lens group G1, an object-facing surface (r5) of the third lens L3 of the second lens group G2, an image-facing surface (r6) of the third lens L3 of the second lens group G2, an object-facing surface (r11) of the sixth lens L6 of the third lens group G3, and an image-facing surface (r12) of the sixth lens L6 of the third lens group G3 are aspherically shaped. Table 8 shows fourth-order aspheric coefficients A, sixth-order aspheric coefficients B, eighth-order aspheric coefficients C, and tenth-order aspheric coefficients D of the aspheric surfaces associated with Example 3 of numerical values along with conic constants K.

TABLE 8

| si | K | A | B | C | D |
|---|---|---|---|---|---|
| 1 | 0.00000E+00 | 1.30795E−03 | −2.74563E−05 | 2.83298E−07 | −1.27146E−09 |
| 2 | 0.00000E+00 | −4.02309E−04 | 9.76180E−05 | −2.97293E−06 | 1.46066E−08 |
| 3 | 0.00000E+00 | −1.44319E−03 | 5.76486E−05 | −1.55041E−06 | 1.95053E−08 |
| 4 | 0.00000E+00 | −7.41809E−04 | 2.34737E−05 | −7.37123E−07 | 1.41276E−08 |
| 6 | −2.57694E+00 | −7.01226E−04 | −2.32219E−04 | −6.79299E−07 | −4.17015E−06 |
| 7 | 4.18532E+00 | −3.76244E−04 | −1.41281E−04 | −1.88899E−05 | −1.03773E−07 |
| 11 | 0.00000E+00 | 6.20887E−04 | −5.12367E−05 | 2.76052E−06 | −6.57107E−08 |
| 12 | 0.00000E+00 | 1.35562E−03 | −8.32716E−05 | 3.75398E−06 | −7.77118E−08 |

During zooming of the zoom lens 3 between the wide angle end and the telephoto end, changes occur in a surface distance d4 between the first lens group G1 and the stop STO, a surface distance d10 between the second lens group G2 and the third lens group G3, and a surface distance d12 between the third lens group G3 and the filter FL. Table 9 shows the amounts of changes in each surface distance that can occur when the lens having the numerical values of Example 3 is set at the wide angle end (at a focal length f of 3.71), when the lens is set at an intermediate focal length (at a focal length f of 7.95), and when the lens is set at the telephoto end (at a focal length f of 17.47). The amounts of changes are shown along with F-numbers Fno and half-angles of view ω.

TABLE 9

| f | 3.71 | 7.95 | 17.47 |
|---|---|---|---|
| Fno | 2.8 | 4.1 | 6.1 |
| ω | 47.8 | 26.1 | 12.6 |
| d4 | 15.085 | 5.700 | 1.300 |
| d10 | 3.035 | 8.621 | 20.568 |
| d12 | 2.490 | 2.394 | 1.900 |

Figure 10:
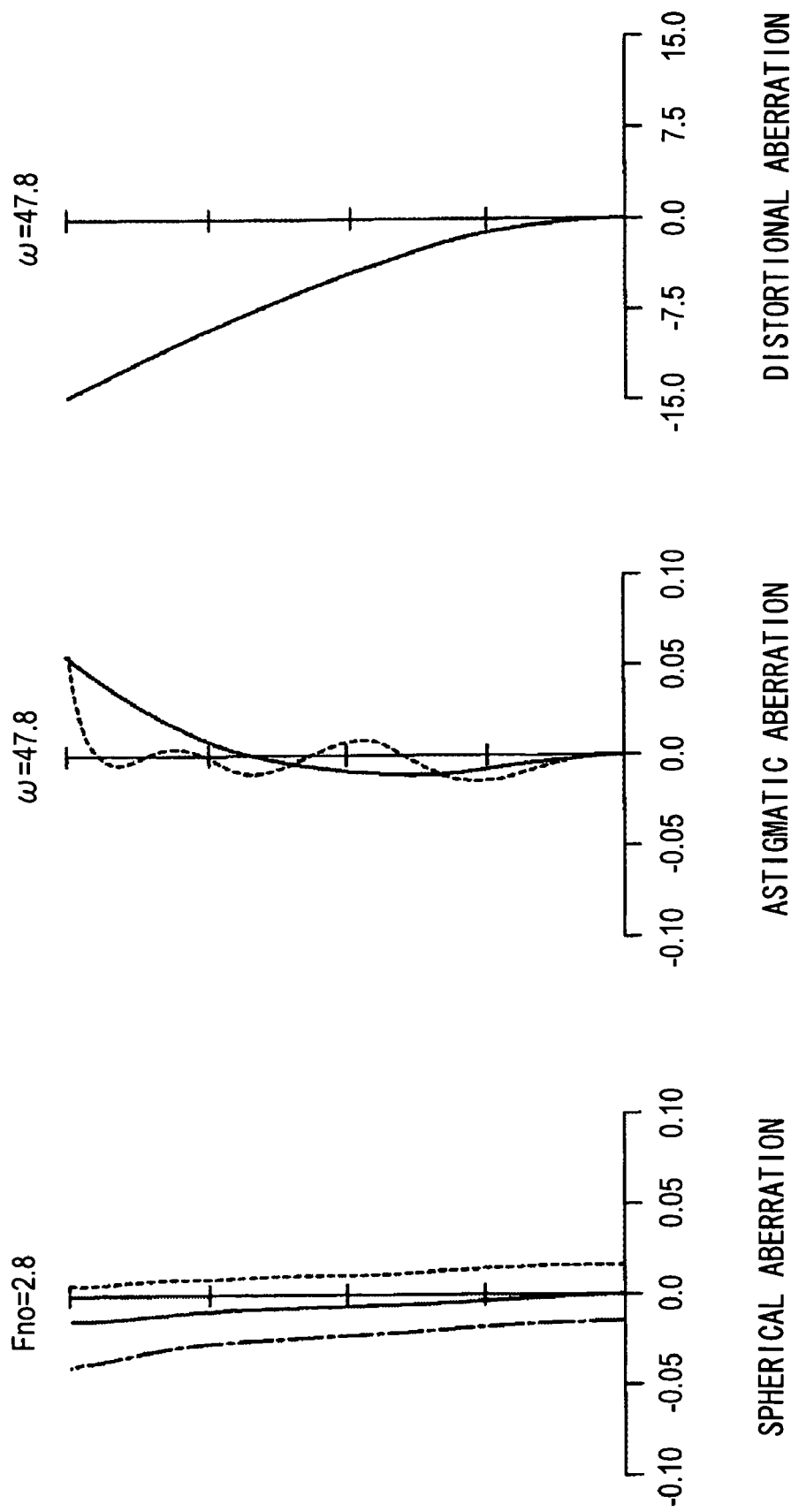
FIG. 10 is aberration diagrams obtained using an example of specific numerical values applied to the third embodiment.
Figure 11:
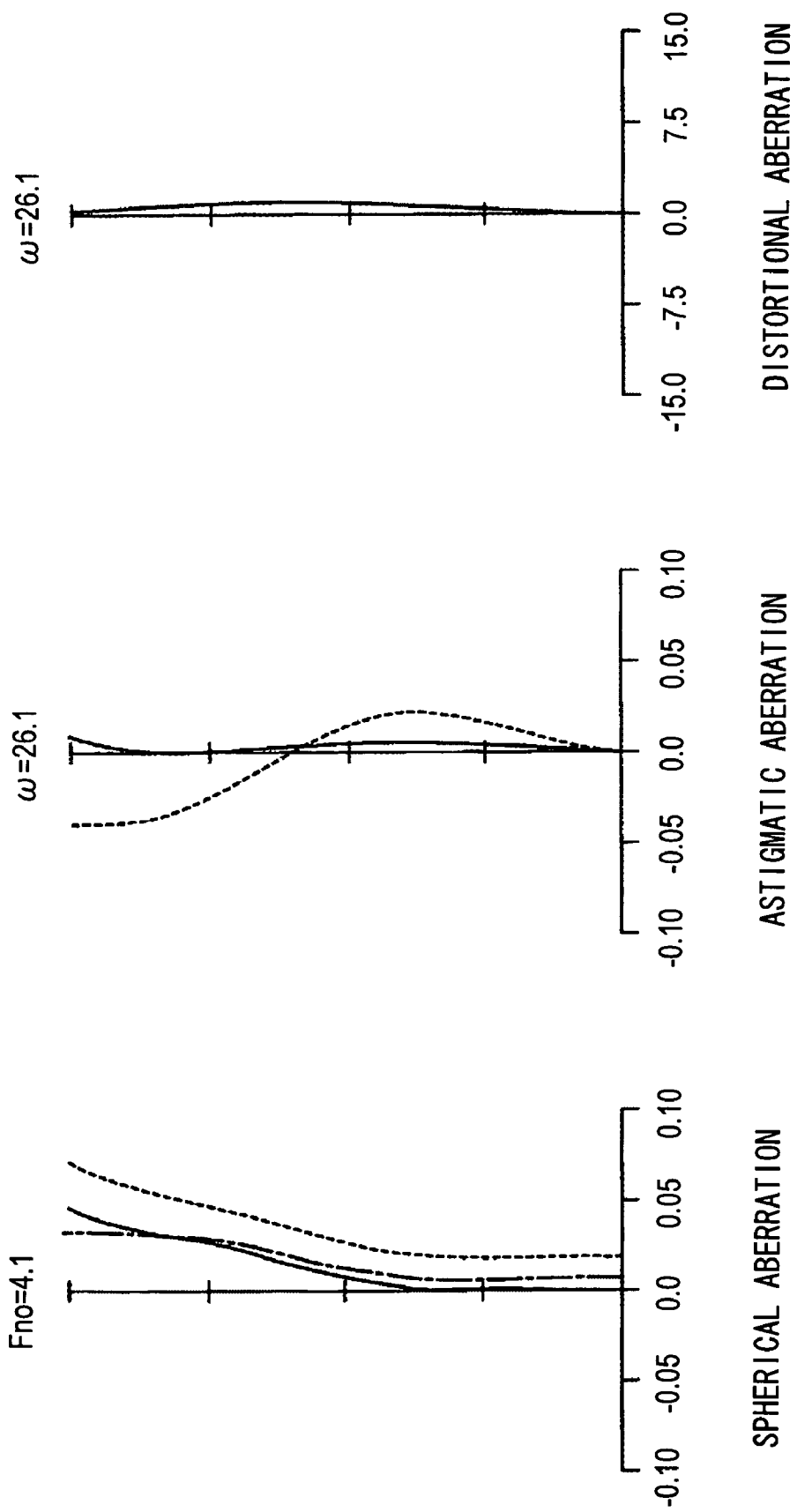
FIG. 11 shows a spherical aberration, an astigmatic aberration, and a distortional aberration observed when the lens of the third embodiment is set at an intermediate focal length.
Figure 12:
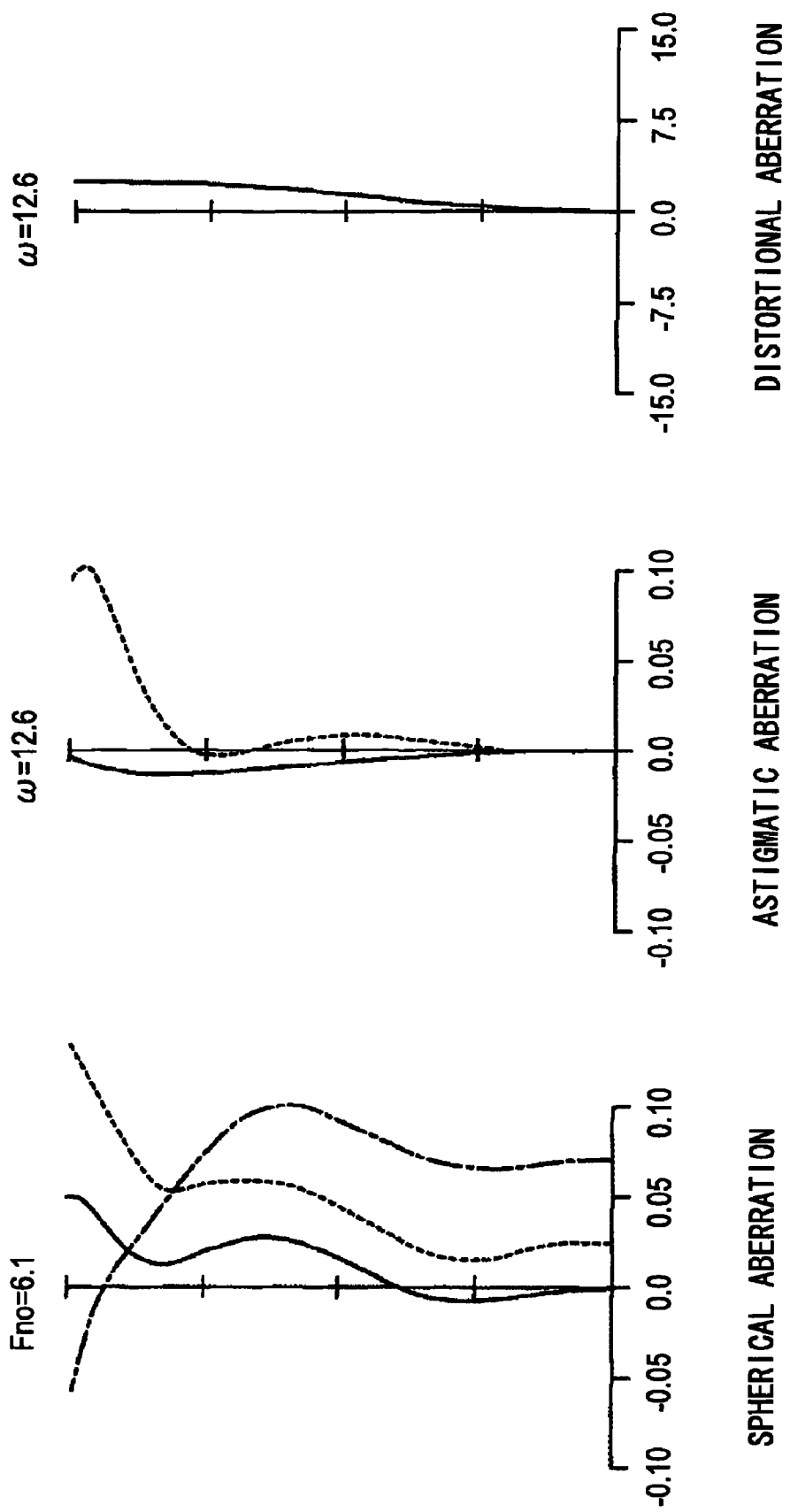
FIG. 12 shows a spherical aberration, an astigmatic aberration, and a distortional aberration observed when the lens of the third embodiment is set at a telephoto end.

FIGS. 10 to 12 show various aberrations encountered when the lens having the numerical values of Example 3 is focused at infinity. FIG. 10 shows aberrations encountered when the lens is set at the wide angle end (at the focal length f of 3.71). FIG. 11 shows aberrations encountered when the lens is set at the intermediate focal length (at the focal length f of 7.95). FIG. 12 shows aberrations encountered when the lens is set at the telephoto end (at the focal length f of 17.47).

In the spherical aberration diagrams shown in FIGS. 10 to 12, solid lines represent values measured using a d-ray (having a wavelength of 587.6 nm); dotted lines represent values measured using a c-ray (having a wavelength of 656.3 nm); and chain lines represent values measured using a g-ray (having a wavelength of 435.8 nm). In the astigmatic aberration diagrams shown in FIGS. 10 to 12, solid lines represent values measured on a sagittal plane, and broken lines represent values measured on a meridional plane.

It is obvious from the aberration diagrams that aberrations can be satisfactorily corrected to achieve high imaging performance by the numerical values of Example 3.

Figure 13:
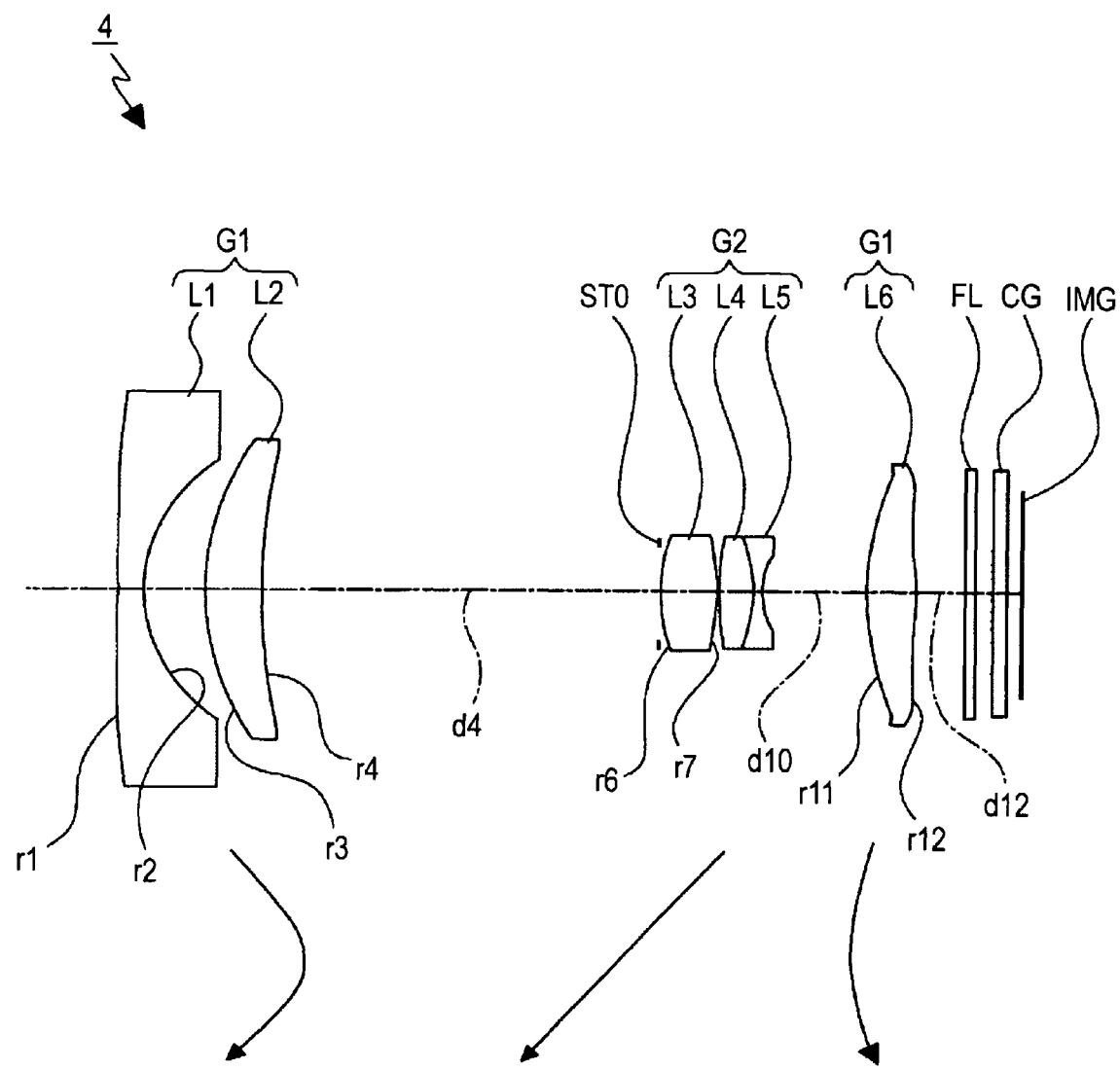
FIG. 13 is an illustration showing a configuration of a fourth embodiment of a zoom lens according to the invention.

FIG. 13 is an illustration showing a configuration of a zoom lens 4 according to a fourth embodiment of the invention.

As shown in FIG. 13, the zoom lens 4 of the fourth embodiment includes six lenses.

The zoom lens 4 includes a first lens group G1 having negative refracting power, a second lens group G2 having positive refracting power, and a third lens group G3 having positive refracting power which are disposed in the order listed from the object side to the image side.

The first lens group G1 includes a first lens L1 and a second lens L2 disposed in the order listed from the object side to the image side. The first lens is a negative lens which is aspherically shaped on both sides thereof and which includes a concave surface facing the image. The second lens is a positive meniscus lens which is aspherically shaped on both sides thereof and which includes a convex surface facing the object.

The second lens group G2 includes a third lens L3 and a cemented lens which are disposed in the order listed from the object side to the image side. The third lens is a positive lens which is aspherically shaped on both sides thereof and which includes a convex surface facing the object. The cemented lens is formed by bonding a fourth lens L4 which is a positive lens having a convex surface facing the object and a fifth lens L5 which is a negative lens having a concave surface facing the image.

The third lens group G3 is constituted by a sixth lens L6 which is a double convex lens aspherically shaped on both sides thereof.

A stop STO (a stop surface r5) is disposed between the first lens group G1 and the second lens group G2.

Between the third lens group G3 and an image plane IMG, a filter FL and a cover glass CG are disposed in the order listed from the object side to the image side.

Table 10 shows lens data which is Example 4 of specific numerical values used in the zoom lens 4 according to the fourth embodiment of the invention.

TABLE 10

| Si | ri | di | ni | vi |
|---|---|---|---|---|
| 1 (ASP) | INFINITY | 1.005 | 1.85135 | 40.100 |
| 2 (ASP) | 5.430 | 2.422 | | |
| 3 (ASP) | 10.253 | 2.073 | 2.00178 | 19.300 |
| 4 (ASP) | 20.110 | (d4) | | |
| 5 (STO) | INFINITY | 0.000 | | |
| 6 (ASP) | 6.267 | 2.107 | 1.62263 | 58.200 |
| 7 (ASP) | −10.967 | 0.100 | | |
| 8 | 12.578 | 1.293 | 1.88300 | 40.800 |
| 9 | −6.283 | 0.400 | 1.69895 | 30.100 |
| 10 | 3.745 | (d10) | | |
| 11 (ASP) | 17.651 | 1.787 | 1.61881 | 63.900 |
| 12 (ASP) | −18.654 | (d12) | | |
| 13 | INFINITY | 0.300 | 1.51872 | 64.200 |
| 14 | INFINITY | 0.720 | | |
| 15 | INFINITY | 0.500 | 1.51872 | 64.200 |
| 16 | INFINITY | 0.600 | | |
| IMG | INFINITY | | | |

In the zoom lens 4, an object-facing surface (r1) of the first lens L1 of the first lens group G1, an image-facing surface (r2) of the first lens L1 of the first lens group G1, an object-facing surface (r3) of the second lens L2 of the first lens group G1, an image-facing surface (r4) of the second lens L2 of the first lens group G1, an object-facing surface (r5) of the third lens L3 of the second lens group G2, an image-facing surface (r6) of the third lens L3 of the second lens group G2, an object-facing surface (r11) of the sixth lens L6 of the third lens group G3, and an image-facing surface (r12) of the sixth lens L6 of the third lens group G3 are aspherically shaped. Table 11 shows fourth-order aspheric coefficients A, sixth-order aspheric coefficients B, eighth-order aspheric coefficients C, and tenth-order aspheric coefficients D of the aspheric surfaces associated with Example 4 of numerical values along with conic constants K.

TABLE 11

| si | K | A | B | C | D |
|---|---|---|---|---|---|
| 1 | 0.00000E+00 | 1.59884E−04 | −3.72197E−06 | 7.91757E−08 | −6.20424E−10 |
| 2 | −8.12109E−01 | −2.81792E−04 | 5.87018E−05 | −2.39167E−06 | 4.42154E−08 |
| 3 | 2.10615E+00 | −6.55595E−04 | 2.96301E−05 | −1.37344E−06 | 6.73062E−09 |
| 4 | 1.20906E+01 | −4.78671E−04 | 2.28519E−05 | −1.42379E−06 | 1.25900E−08 |
| 6 | 0.00000E+00 | −1.87629E−03 | −1.24179E−04 | 6.58784E−06 | −1.88322E−06 |
| 7 | 0.00000E+00 | −2.42967E−04 | −1.73790E−04 | 2.38709E−05 | −3.46370E−06 |
| 11 | 0.00000E+00 | 1.75855E−03 | −1.22088E−04 | 5.57392E−06 | −1.26236E−07 |
| 12 | 0.00000E+00 | 3.05623E−03 | −1.77526E−04 | 6.43656E−06 | −1.28821E−07 |

During zooming of the zoom lens 4 between a state the wide angle end and the telephoto end, changes occur in a surface distance d4 between the first lens group G1 and the stop STO, a surface distance d10 between the second lens group G2 and the third lens group G3, and a surface distance d12 between the third lens group G3 and the filter FL. Table 12 shows the amounts of changes in each surface distance that can occur when the lens having the numerical values of Example 4 is set at the wide angle end (at a focal length f of 3.71), when the lens is set at an intermediate focal length (at a focal length f of 7.22), and when the lens is set at the telephoto end (at a focal length f of 14.10). The amounts of changes are shown along with F-numbers Fno and half-angles of view ω.

TABLE 12

| f | 3.71 | 7.22 | 14.10 |
|---|---|---|---|
| Fno | 2.9 | 3.8 | 5.8 |
| ω | 47.8 | 28.4 | 15.5 |
| d4 | 15.179 | 5.270 | 0.826 |
| d10 | 4.014 | 7.717 | 16.597 |
| d12 | 1.900 | 2.374 | 1.900 |

Figure 14:
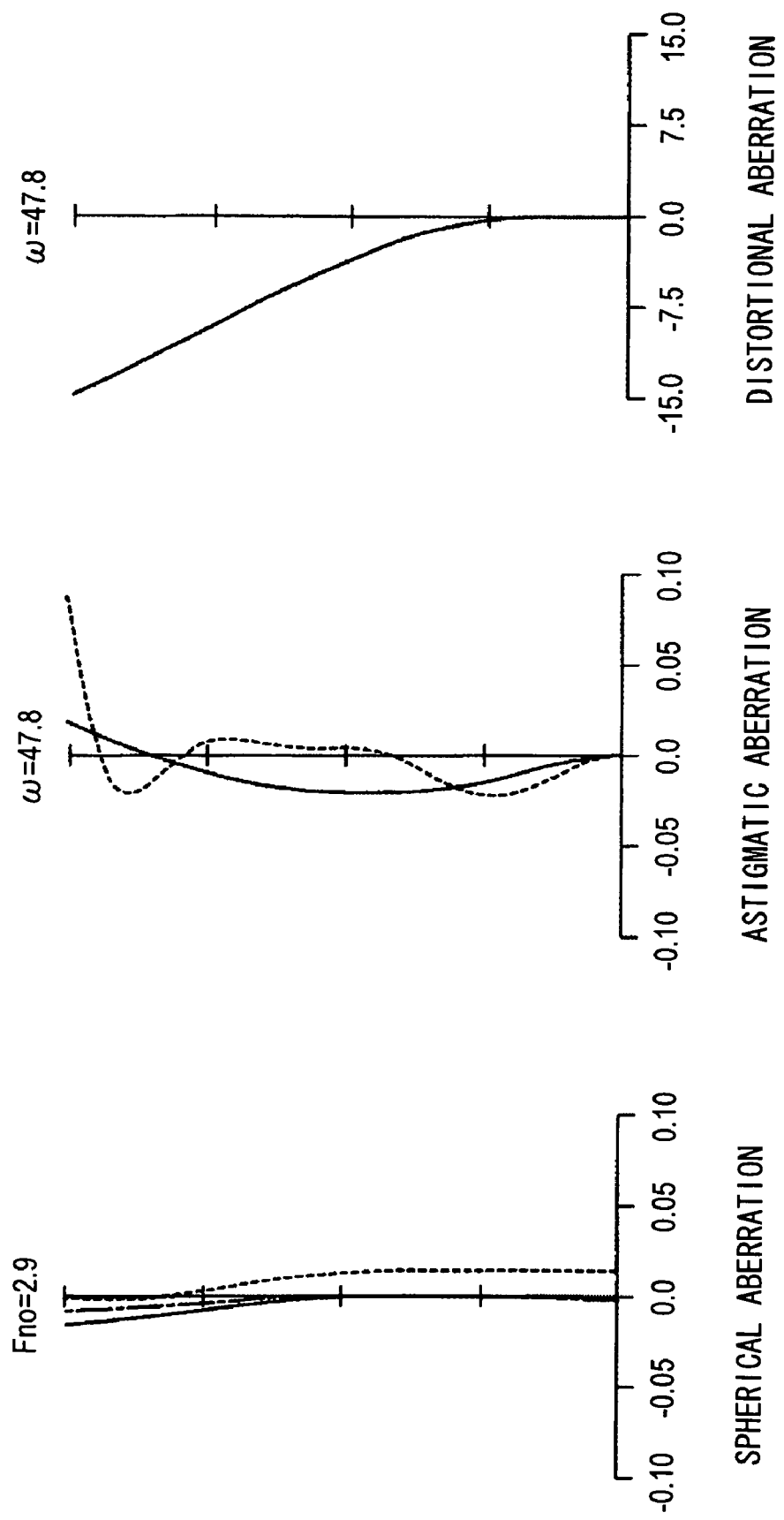
FIG. 14 is aberration diagrams obtained using an example of specific numerical values applied to the fourth embodiment.
Figure 15:
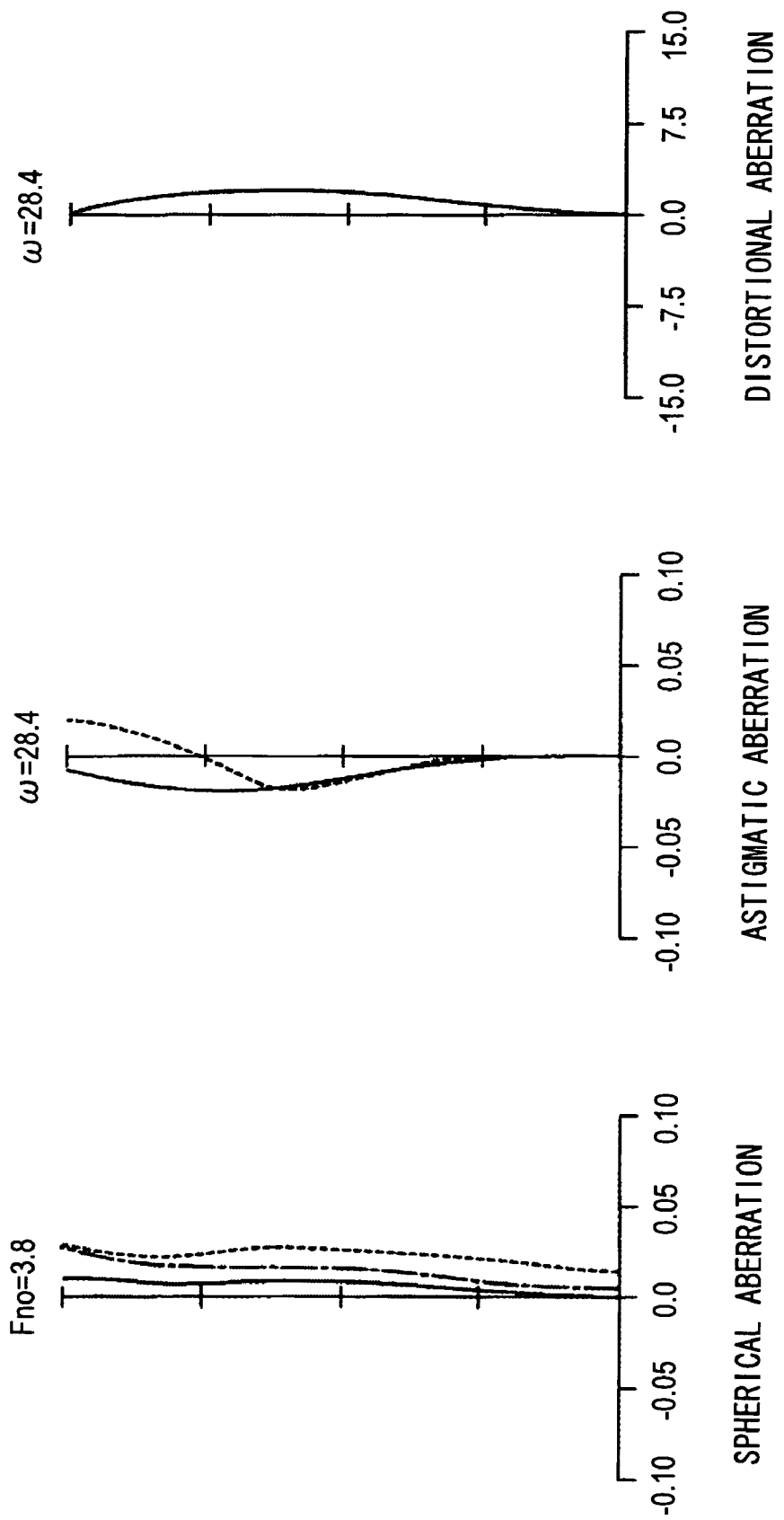
FIG. 15 shows a spherical aberration, an astigmatic aberration, and a distortional aberration observed when the lens of the fourth embodiment is set at an intermediate focal length.
Figure 16:
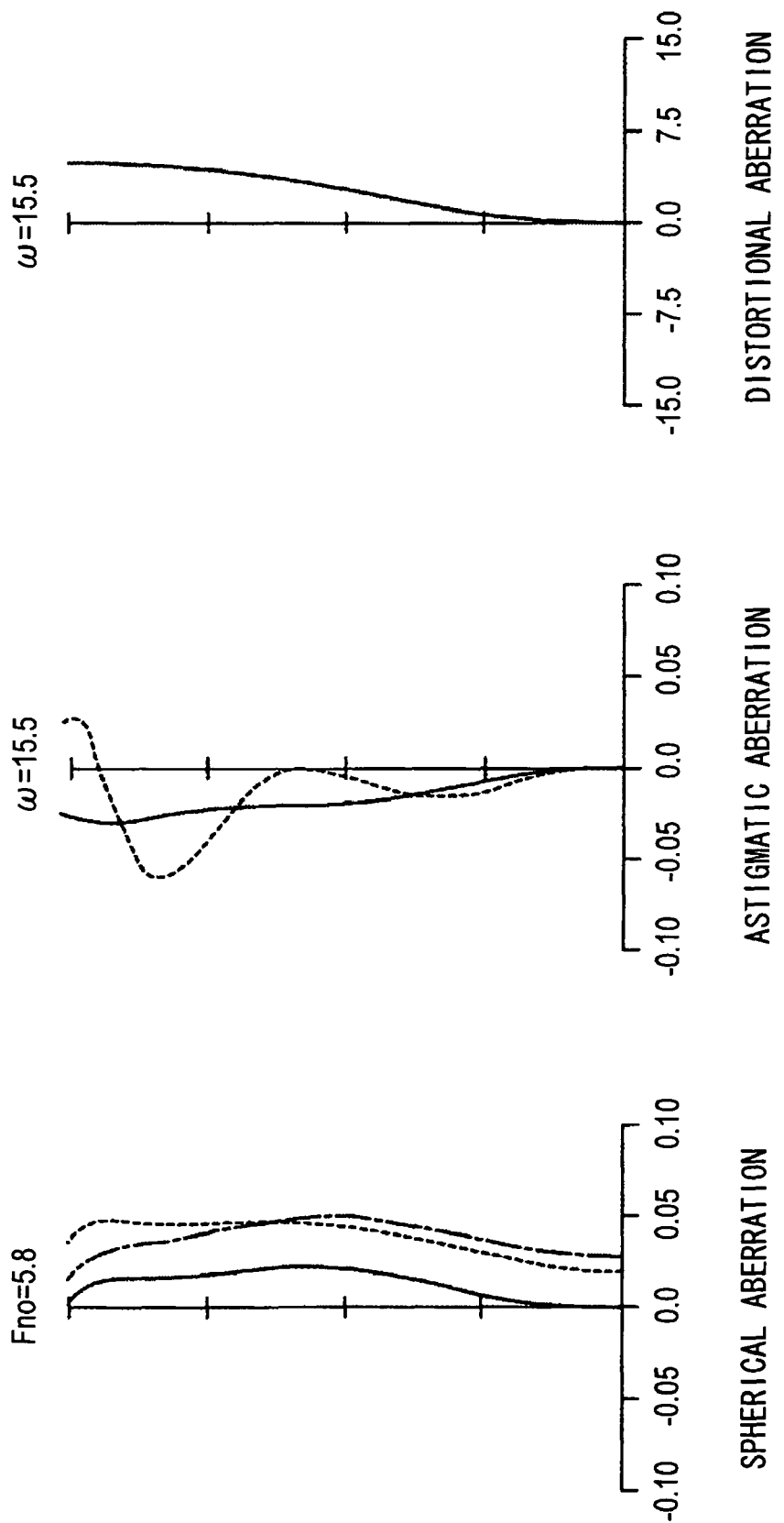
FIG. 16 shows a spherical aberration, an astigmatic aberration, and a distortional aberration observed when the lens of the fourth embodiment is set at a telephoto end.

FIGS. 14 to 16 show various aberrations encountered when the lens having the numerical values of Example 4 is focused at infinity. FIG. 14 shows aberrations encountered when the lens is set at the wide angle end (at the focal length f of 3.71). FIG. 15 shows aberrations encountered when the lens is set at the intermediate focal length (at the focal length f of 7.22). FIG. 16 shows aberrations encountered when the lens is set at the telephoto end (at the focal length f of 14.10).

In the spherical aberration diagrams shown in FIGS. 14 to 16, solid lines represent values measured using a d-ray (having a wavelength of 587.6 nm); dotted lines represent values measured using a c-ray (having a wavelength of 656.3 nm); and chain lines represent values measured using a g-ray (having a wavelength of 435.8 nm). In the astigmatic aberration diagrams shown in FIGS. 14 to 16, solid lines represent values measured on a sagittal plane, and broken lines represent values measured on a meridional plane.

It is obvious from the aberration diagrams that aberrations can be satisfactorily corrected to achieve high imaging performance by the numerical values of Example 4.

Figure 17:
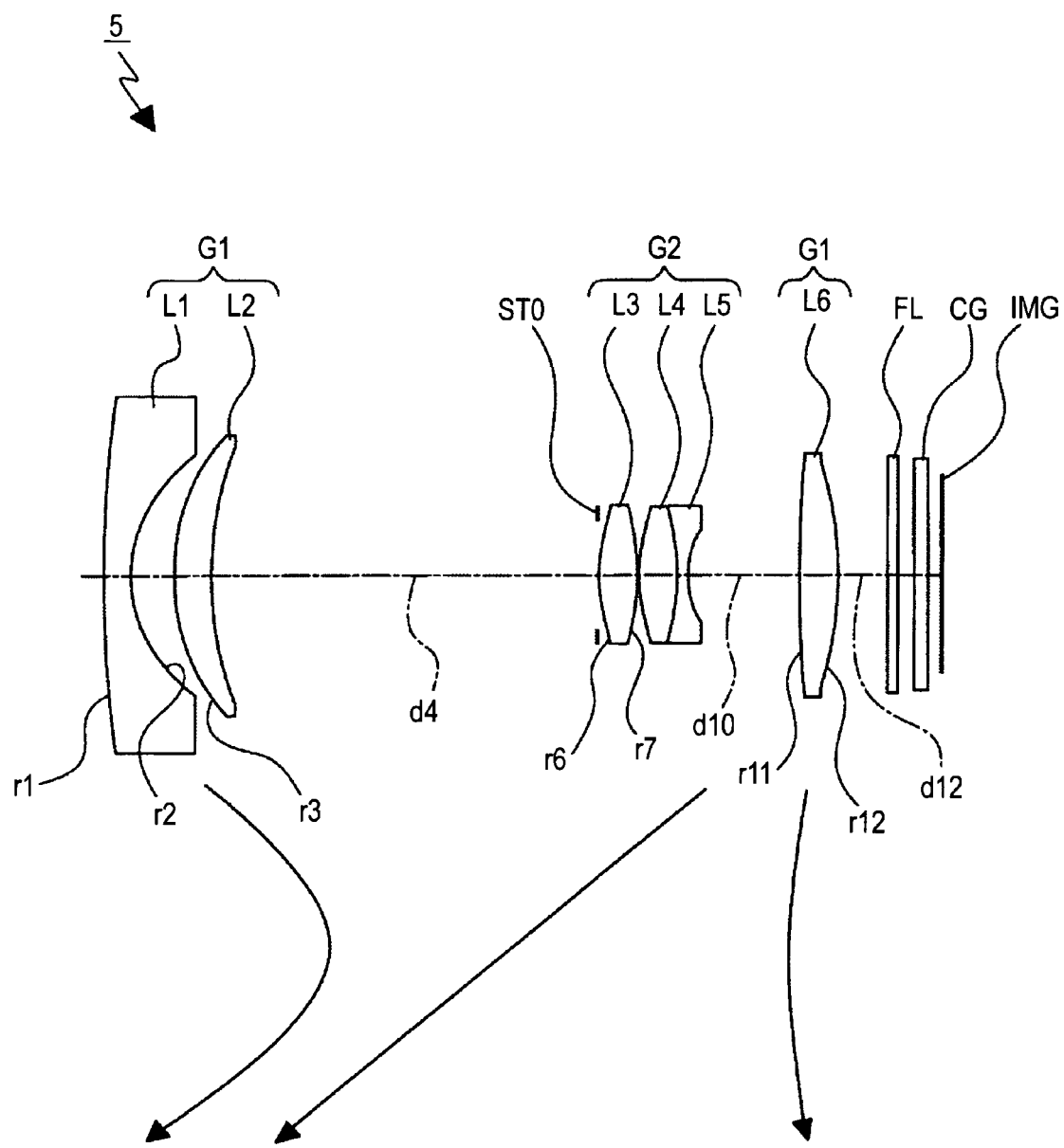
FIG. 17 is an illustration showing a configuration of a fifth embodiment of a zoom lens according to the invention.

FIG. 17 is an illustration showing a configuration of a zoom lens 5 according to a fifth embodiment of the invention.

As shown in FIG. 17, the zoom lens 5 of the fifth embodiment includes six lenses.

The zoom lens 5 includes a first lens group G1 having negative refracting power, a second lens group G2 having positive refracting power, and a third lens group G3 having positive refracting power which are disposed in the order listed from the object side to the image side.

The first lens group G1 includes a first lens L1 and a second lens L2 disposed in the order listed from the object side to the image side. The first lens is a negative lens which is aspherically shaped on both sides thereof and which includes a concave surface facing the image. The second lens (L2) is a positive meniscus lens which is aspherically shaped on a side thereof facing the object and which includes a convex surface facing the object.

The second lens group G2 includes a third lens L3 and a cemented lens which are disposed in the order listed from the object side to the image side. The third lens (L3) is a positive lens which is aspherically shaped on both sides thereof and which includes a convex surface facing the object. The cemented lens is formed by bonding a fourth lens L4 which is a positive lens having a convex surface facing the object and a fifth lens L5 which is a negative lens having a concave surface facing the image.

The third lens group G3 is constituted by a sixth lens L6 which is a double convex lens aspherically shaped on both sides thereof.

A stop STO (a stop surface r5) is disposed between the first lens group G1 and the second lens group G2.

Between the third lens group G3 and an image plane IMG, a filter FL and a cover glass CG are disposed in the order listed from the object side to the image side.

Table 13 shows lens data which is Example 5 of specific numerical values used in the zoom lens 5 according to the fifth embodiment of the invention.

TABLE 13

| si | ri | di | ni | vi |
|---|---|---|---|---|
| 1 (ASP) | 51.004 | 1.000 | 1.85135 | 40.105 |
| 2 (ASP) | 5.314 | 1.785 | | |
| 3 (ASP) | 9.137 | 1.561 | 2.00178 | 19.300 |
| 4 | 15.749 | (d4) | | |
| 5 (STO) | INFINITY | 0.000 | | |
| 6 (ASP) | 6.000 | 1.598 | 1.58247 | 56.335 |

TABLE 13-continued

| si | ri | di | ni | vi |
|---|---|---|---|---|
| 7 (ASP) | −15.365 | 0.100 | | |
| 8 | 8.026 | 1.533 | 1.87104 | 41.305 |
| 9 | −9.264 | 0.400 | 1.71899 | 28.695 |
| 10 | 3.497 | (d10) | | |
| 11 (ASP) | 70.076 | 1.638 | 1.69362 | 50.541 |
| 12 (ASP) | −13.716 | (d12) | | |
| 13 | INFINITY | 0.300 | 1.51680 | 64.198 |
| 14 | INFINITY | 0.720 | | |
| 15 | INFINITY | 0.500 | 1.56883 | 56.044 |
| 16 | INFINITY | 0.600 | | |
| IMG | INFINITY | | | |

In the zoom lens 5, an object-facing surface (r1) of the first lens L1 of the first lens group G1, an image-facing surface (r2) of the first lens L1 of the first lens group G1, an object-facing surface (r3) of the second lens L2 of the first lens group G1, an object-facing surface (r6) of the third lens L3 of the second lens group G2, an image-facing surface (r7) of the third lens L3 of the second lens group G2, an object-facing surface (r11) of the sixth lens L6 of the third lens group G3, and an image-facing surface (r12) of the sixth lens L6 of the third lens group G3 are aspherically shaped. Table 14 shows fourth-order aspheric coefficients A, sixth-order aspheric coefficients B, eighth-order aspheric coefficients C, and tenth-order aspheric coefficients D of the aspheric surfaces associated with Example 5 of numerical values along with conic constants K.

TABLE 14

| si | K | A | B | C | D |
|---|---|---|---|---|---|
| 1 | 2.00000E+01 | −3.82228E−04 | 1.61100E−05 | −2.86224E−07 | 1.83919E−09 |
| 2 | −6.30061E−01 | −1.87645E−04 | 4.09565E−06 | 9.01119E−07 | −2.07780E−08 |
| 3 | 5.82719E−01 | 4.08756E−05 | −1.05486E−05 | 3.81277E−07 | −5.90413E−09 |
| 6 | 7.42552E−01 | −1.88762E−03 | −1.08777E−04 | −1.38619E−06 | −1.22583E−06 |
| 7 | −1.89121E+01 | −1.03424E−03 | −5.42931E−05 | −6.62005E−06 | −4.42598E−07 |
| 11 | −2.00000E+01 | −2.23021E−04 | −1.91394E−05 | 2.70836E−06 | −5.95498E−08 |
| 12 | 4.10525E+00 | 5.73254E−04 | −5.25225E−05 | 4.53761E−06 | −8.85550E−08 |

During zooming of the zoom lens 5 between the wide angle end and the telephoto end, changes occur in a surface distance d4 between the first lens group G1 and the stop STO, a surface distance d10 between the second lens group G2 and the third lens group G3, and a surface distance d12 between the third lens group G3 and the filter FL. Table 15 shows the amounts of changes in each surface distance that can occur when the lens having the numerical values of Example 5 is set at the wide angle end (at a focal length f of 4.41), when the lens is set at an intermediate focal length (at a focal length f of 9.57), and when the lens is set at the telephoto end (at a focal length f of 20.77). The amounts of changes are shown along with F-numbers Fno and half-angles of view ω.

TABLE 15

| f | 4.41 | 9.57 | 20.77 |
|---|---|---|---|
| Fno | 2.51 | 3.59 | 6.09 |
| ω | 42.91 | 22.17 | 10.63 |
| d4 | 15.782 | 5.332 | 0.880 |
| d10 | 4.600 | 9.750 | 21.886 |
| d12 | 2.013 | 2.349 | 1.900 |

Figure 18:
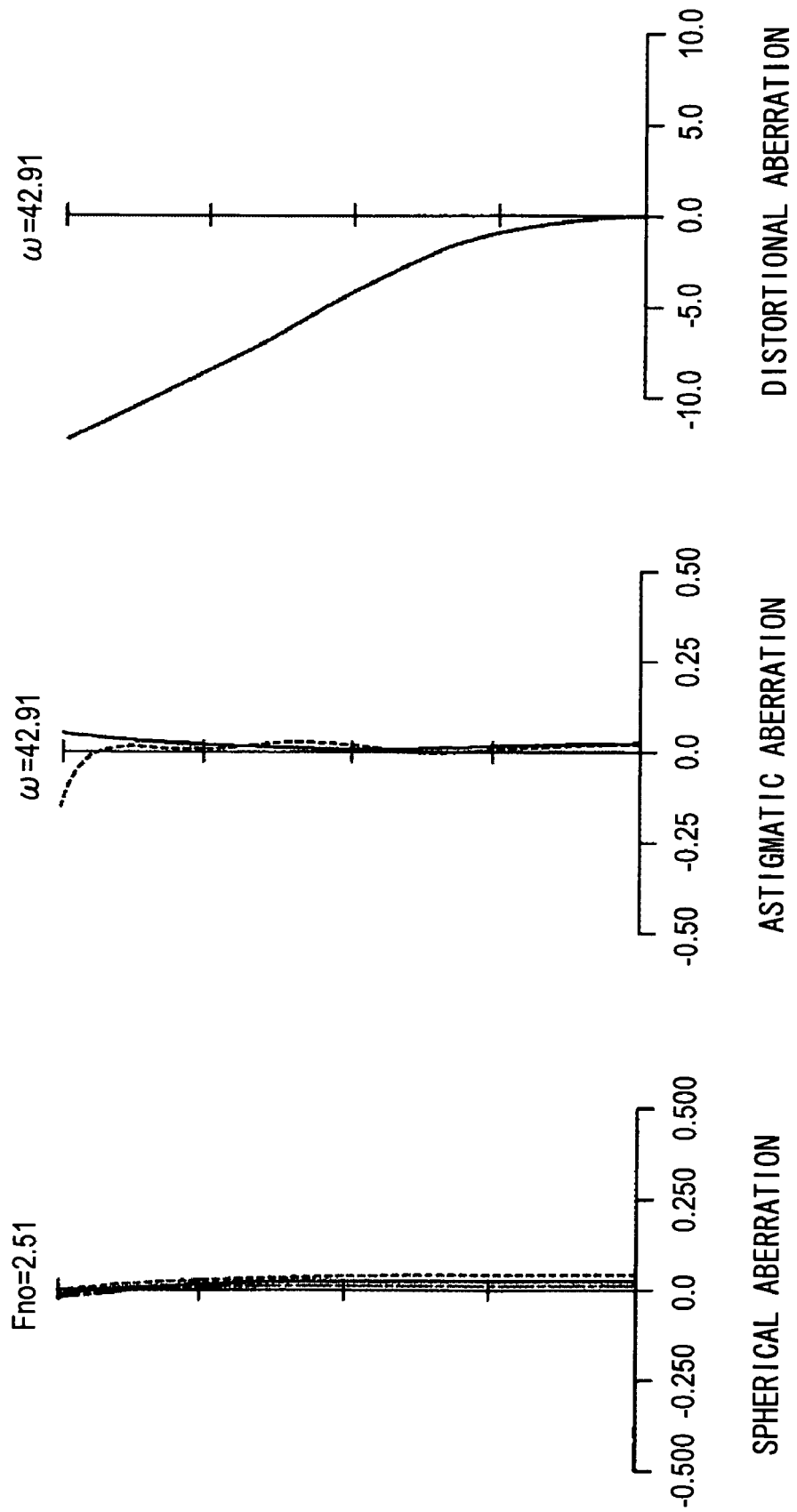
FIG. 18 is aberration diagrams obtained using an example of specific numerical values applied to the fifth embodiment.
Figure 19:
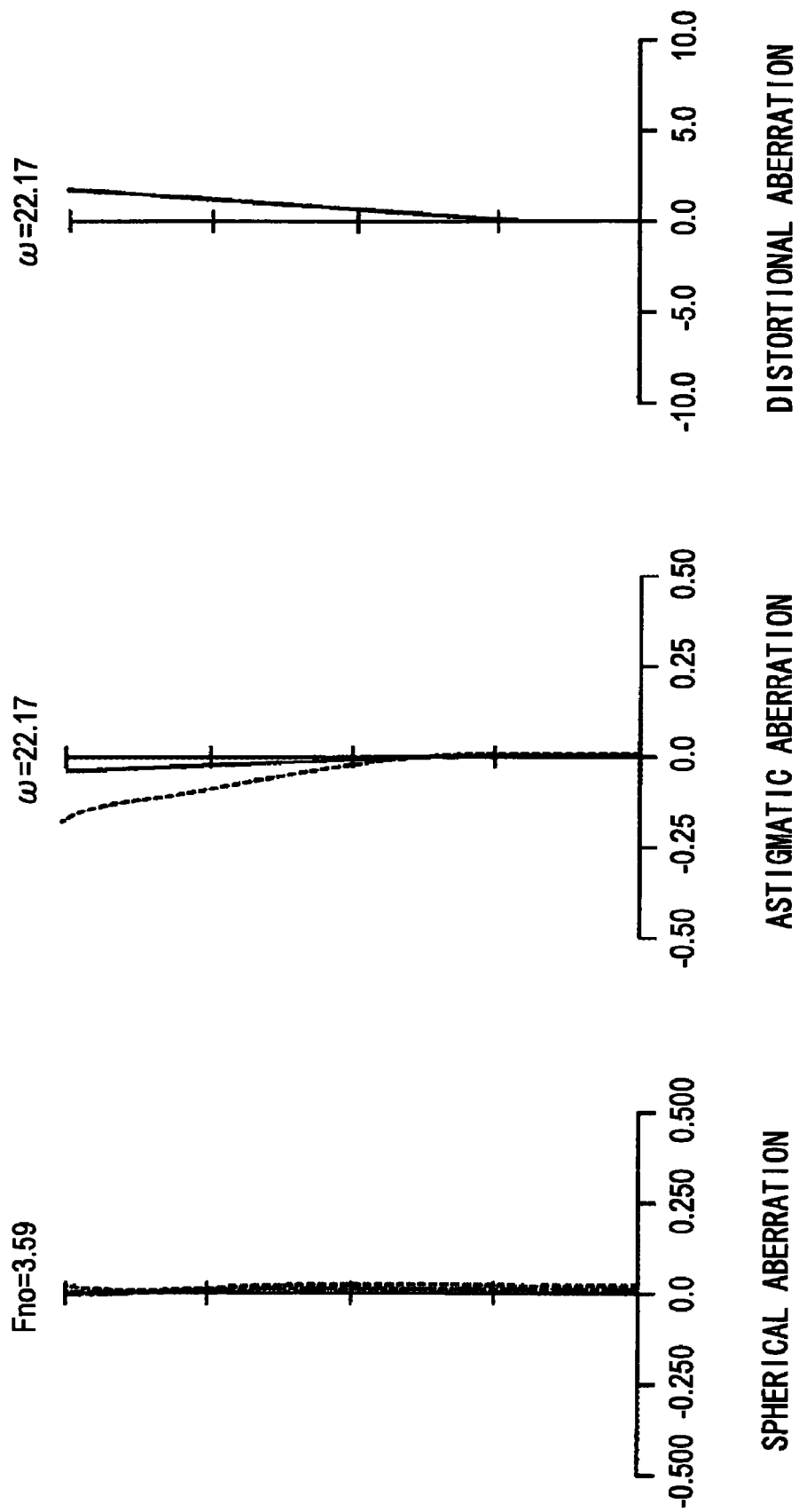
FIG. 19 shows a spherical aberration, an astigmatic aberration, and a distortional aberration observed when the lens of the fifth embodiment is set at an intermediate focal length.
Figure 20:
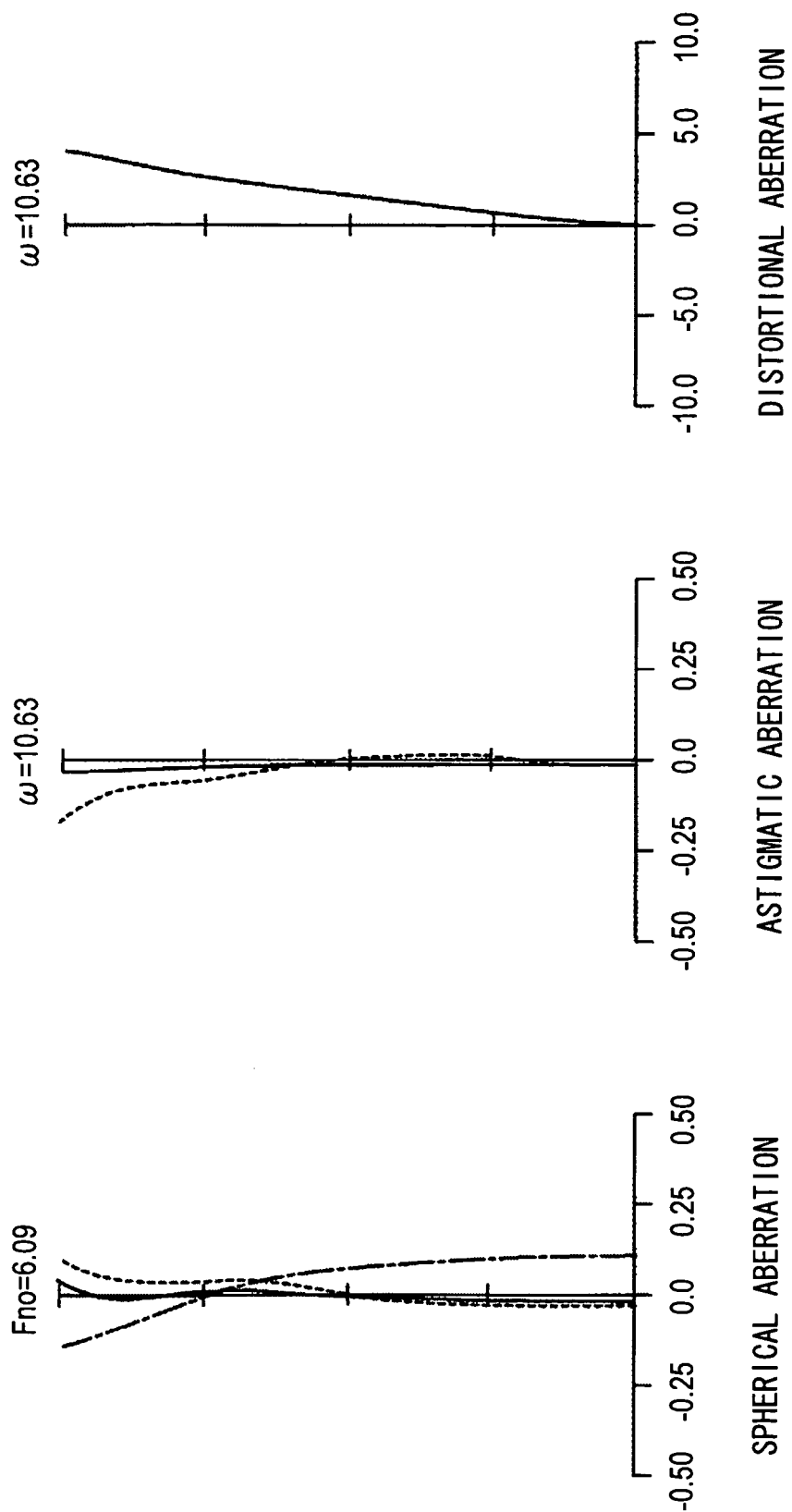
FIG. 20 shows a spherical aberration, an astigmatic aberration, and a distortional aberration observed when the lens of the fifth embodiment is set at a telephoto end.

FIGS. 18 to 20 show various aberrations encountered when the lens having the numerical values of example 5 is focused at infinity. FIG. 18 shows aberrations encountered when the lens is set at the wide angle end (at the focal length f of 4.41). FIG. 19 shows aberrations encountered when the lens is set at the intermediate focal length (at the focal length f of 9.57). FIG. 20 shows aberrations encountered when the lens is set at the telephoto end (at the focal length f of 20.77).

In the spherical aberration diagrams shown in FIGS. 18 to 20, solid lines represent values measured using a d-ray (having a wavelength of 587.6 nm); dotted lines represent values measured using a c-ray (having a wavelength of 656.3 nm); and chain lines represent values measured using a g-ray (having a wavelength of 435.8 nm). In the astigmatic aberration diagrams shown in FIGS. 18 to 20, solid lines represent values measured on a sagittal plane, and broken lines represent values measured on a meridional plane.

It is obvious from the aberration diagrams that aberrations can be satisfactorily corrected to achieve high imaging performance by the numerical values of Example 5.

Figure 21:
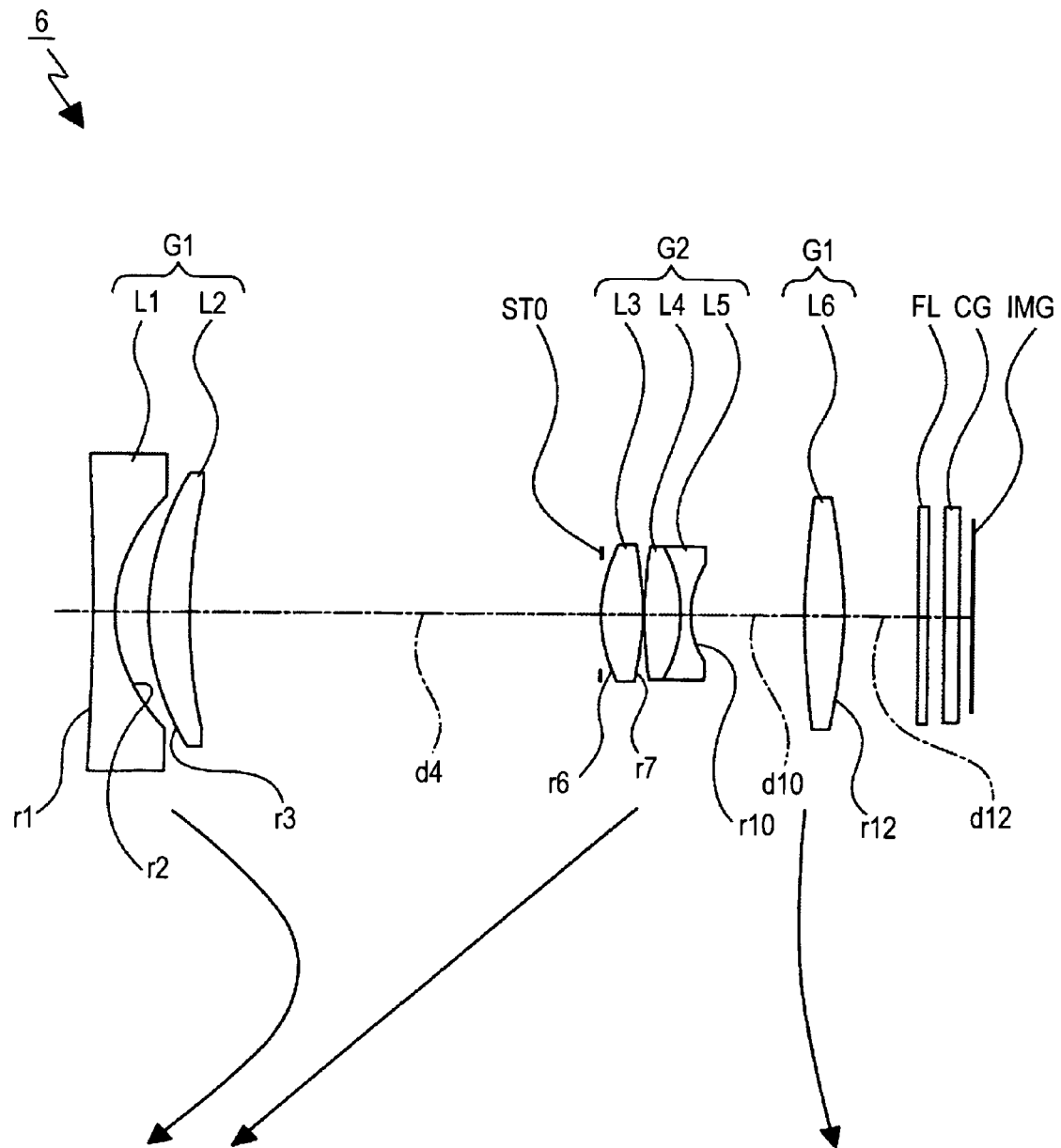
FIG. 21 is an illustration showing a configuration of a sixth embodiment of a zoom lens according to the invention.

FIG. 21 is an illustration showing a configuration of a zoom lens 6 according to a sixth embodiment of the invention.

As shown in FIG. 21, the zoom lens 6 of the sixth embodiment includes six lenses.

The zoom lens 6 includes a first lens group G1 having negative refracting power, a second lens group G2 having positive refracting power, and a third lens group G3 having positive refracting power which are disposed in the order listed from the object side to the image side.

The first lens group G1 includes a first lens L1 and a second lens L2 disposed in the order listed from the object side to the image side. The first lens is a negative lens which is aspherically shaped on both sides thereof and which includes a concave surface facing the image. The second lens is a positive meniscus lens which is aspherically shaped on a side thereof facing the object and which includes a convex surface facing the object.

The second lens group G2 includes a third lens L3 and a cemented lens which are disposed in the order listed from the object side to the image side. The third lens is a positive lens which is aspherically shaped on both sides thereof and which includes a convex surface facing the object. The cemented lens is formed by bonding a fourth lens L4 which is a positive lens having a convex surface facing the object and a fifth lens L5 which is a negative lens aspherically shaped on a side thereof facing the image and having a concave surface facing the image.

The third lens group G3 is constituted by a sixth lens L6 which is a double convex lens aspherically shaped on a side thereof facing the image.

A stop STO (a stop surface r5) is disposed between the first lens group G1 and the second lens group G2.

Between the third lens group G3 and an image plane IMG, a filter FL and a cover glass CG are disposed in the order listed from the object side to the image side.

Table 16 shows lens data which is Example 6 of specific numerical values used in the zoom lens 6 according to the sixth embodiment of the invention.

TABLE 16

| si | ri | di | ni | vi |
|---|---|---|---|---|
| 1 (ASP) | 214.861 | 0.856 | 1.83441 | 37.285 |
| 2 (ASP) | 6.216 | 1.440 | | |
| 3 (ASP) | 11.506 | 1.676 | 2.00178 | 19.300 |
| 4 | 27.509 | (d4) | | |
| 5 (STO) | INFINITY | 0.000 | | |
| 6 (ASP) | 6.066 | 1.599 | 1.69350 | 53.201 |
| 7 (ASP) | −18.570 | 0.100 | | |
| 8 | 20.914 | 1.508 | 1.84840 | 42.337 |
| 9 | −5.878 | 0.400 | 1.68893 | 31.161 |
| 10 (ASP) | 4.322 | (d10) | | |
| 11 | 38.250 | 1.614 | 1.58313 | 59.461 |
| 12 (ASP) | −14.779 | (d12) | | |
| 13 | INFINITY | 0.300 | 1.51680 | 64.198 |
| 14 | INFINITY | 0.720 | | |
| 15 | INFINITY | 0.500 | 1.56883 | 56.044 |
| 16 | INFINITY | 0.600 | | |
| IMG | INFINITY | | | |

In the zoom lens 6, an object-facing surface (r1) of the first lens L1 of the first lens group G1, an image-facing surface (r2) of the first lens L1 of the first lens group G1, an object-facing surface (r3) of the second lens L2 of the first lens group G1, an object-facing surface (r6) of the third lens L3 of the second lens group G2, an image-facing surface (r7) of the third lens L3 of the second lens group G2, an image-facing surface (r10) of the fifth lens L5 of the second lens group G2, and an image-facing surface (r12) of the sixth lens L6 of the third lens group G3 are aspherically shaped. Table 17 shows fourth-order aspheric coefficients A, sixth-order aspheric coefficients B, eighth-order aspheric coefficients C, and tenth-order aspheric coefficients D of the aspheric surfaces associated with Example 6 of numerical values along with conic constants K.

TABLE 17

| si | K | A | B | C | D |
|---|---|---|---|---|---|
| 1 | 2.00000E+01 | −5.77098E−04 | 2.16778E−05 | −3.67842E−07 | 2.26605E−09 |
| 2 | −6.30061E−01 | −3.61688E−04 | −4.54523E−06 | 9.54388E−07 | −1.92890E−08 |
| 3 | 5.82719E−01 | 1.81106E−04 | −1.66087E−05 | 6.07038E−07 | −7.79703E−09 |
| 6 | 7.42552E−01 | −1.46402E−03 | −7.77951E−05 | −1.38619E−06 | −1.22583E−06 |
| 7 | −1.89121E+01 | −3.24238E−04 | −5.71526E−05 | −6.62005E−06 | −4.42598E−07 |
| 10 | 0.00000E+00 | 2.04650E−04 | 8.23001E−05 | 0.00000E+00 | 0.00000E+00 |
| 12 | 4.10525E+00 | 7.18035E−04 | −2.06750E−05 | 7.96198E−07 | −1.05179E−08 |

During zooming of the zoom lens 6 between the wide angle end and the telephoto end, changes occur in a surface distance d4 between the first lens group G1 and the stop STO, a surface distance d10 between the second lens group G2 and the third lens group G3, and a surface distance d12 between the third lens group G3 and the filter FL. Table 18 shows the amounts of changes in each surface distance that can occur when the lens having the numerical values of Example 6 is set at the wide angle end (at a focal length f of 5.1), when the lens is set at an intermediate focal length (at a focal length f of 10.58), and when the lens is set at the telephoto end (at a focal length f of 21.93). The amounts of changes are shown along with F-numbers Fno and half-angles of view ω.

TABLE 18

| f | 5.1 | 10.58 | 21.93 |
|---|---|---|---|
| Fno | 2.59 | 3.64 | 5.96 |
| ω | 38.85 | 19.97 | 9.76 |
| d4 | 16.630 | 5.672 | 0.880 |
| d10 | 4.600 | 10.211 | 22.308 |
| d12 | 2.999 | 3.109 | 1.900 |

Figure 22:
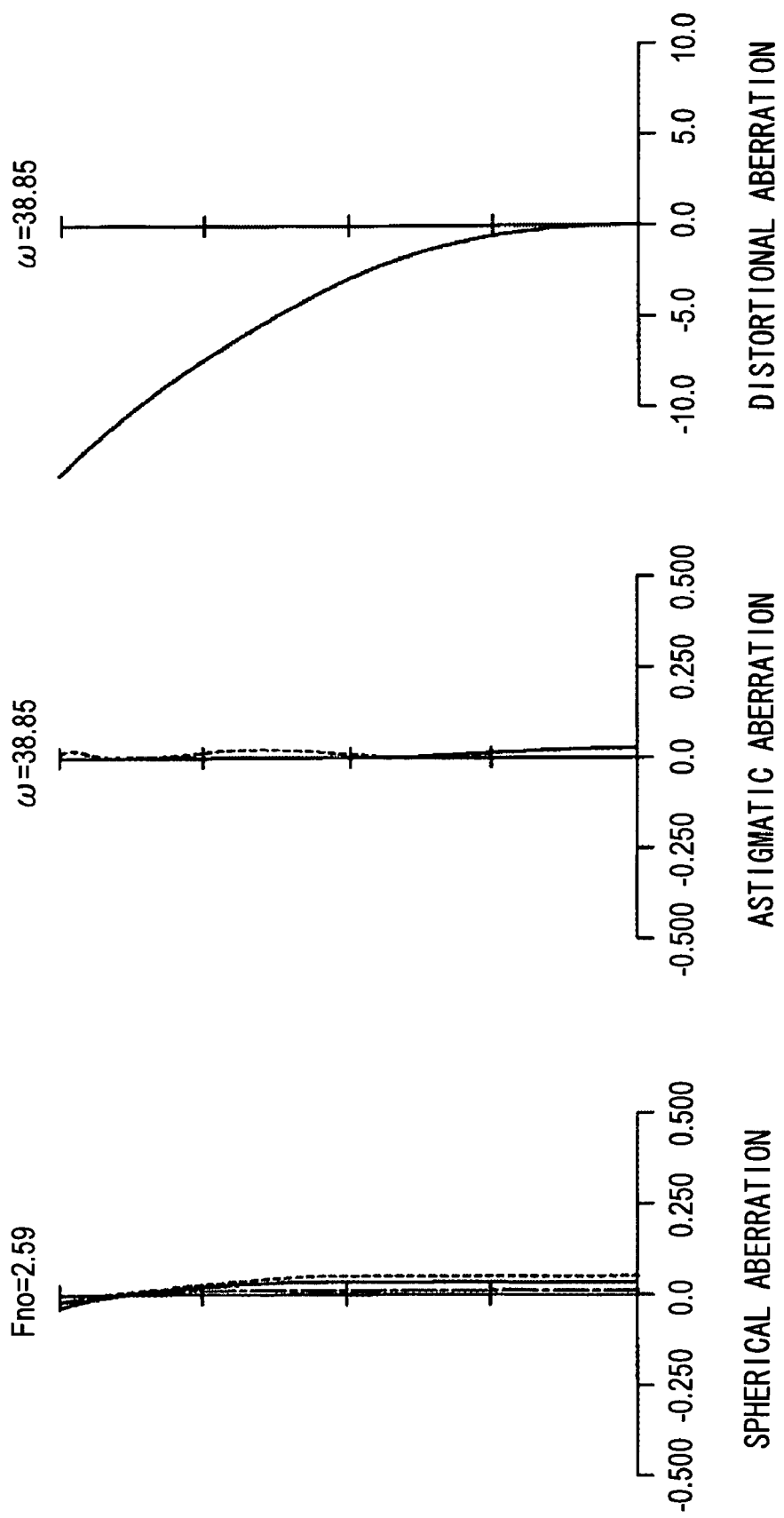
FIG. 22 is aberration diagrams obtained using an example of specific numerical values applied to the sixth embodiment.
Figure 23:
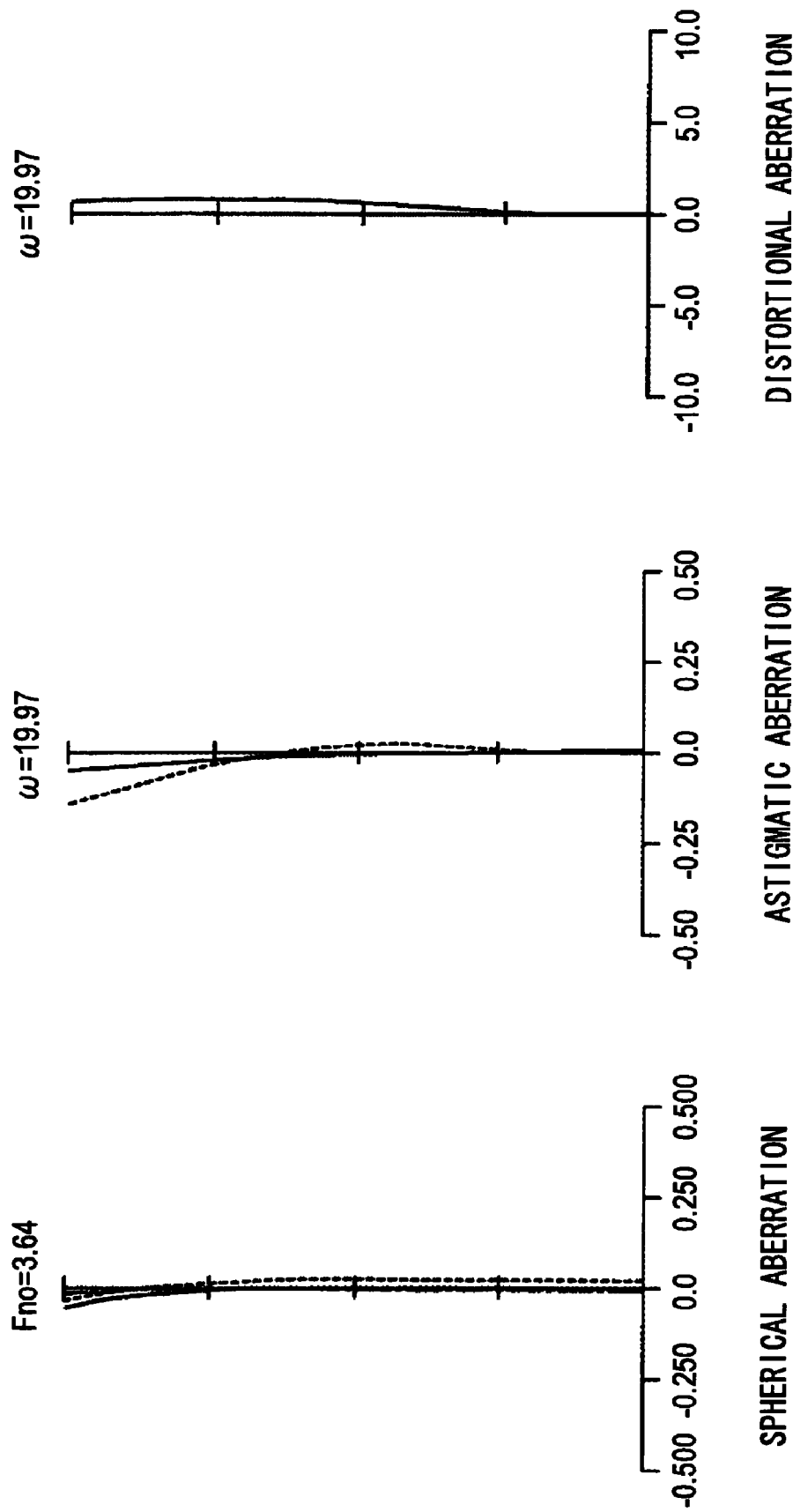
FIG. 23 shows a spherical aberration, an astigmatic aberration, and a distortional aberration observed when the lens of the sixth embodiment is set at an intermediate focal length.
Figure 24:
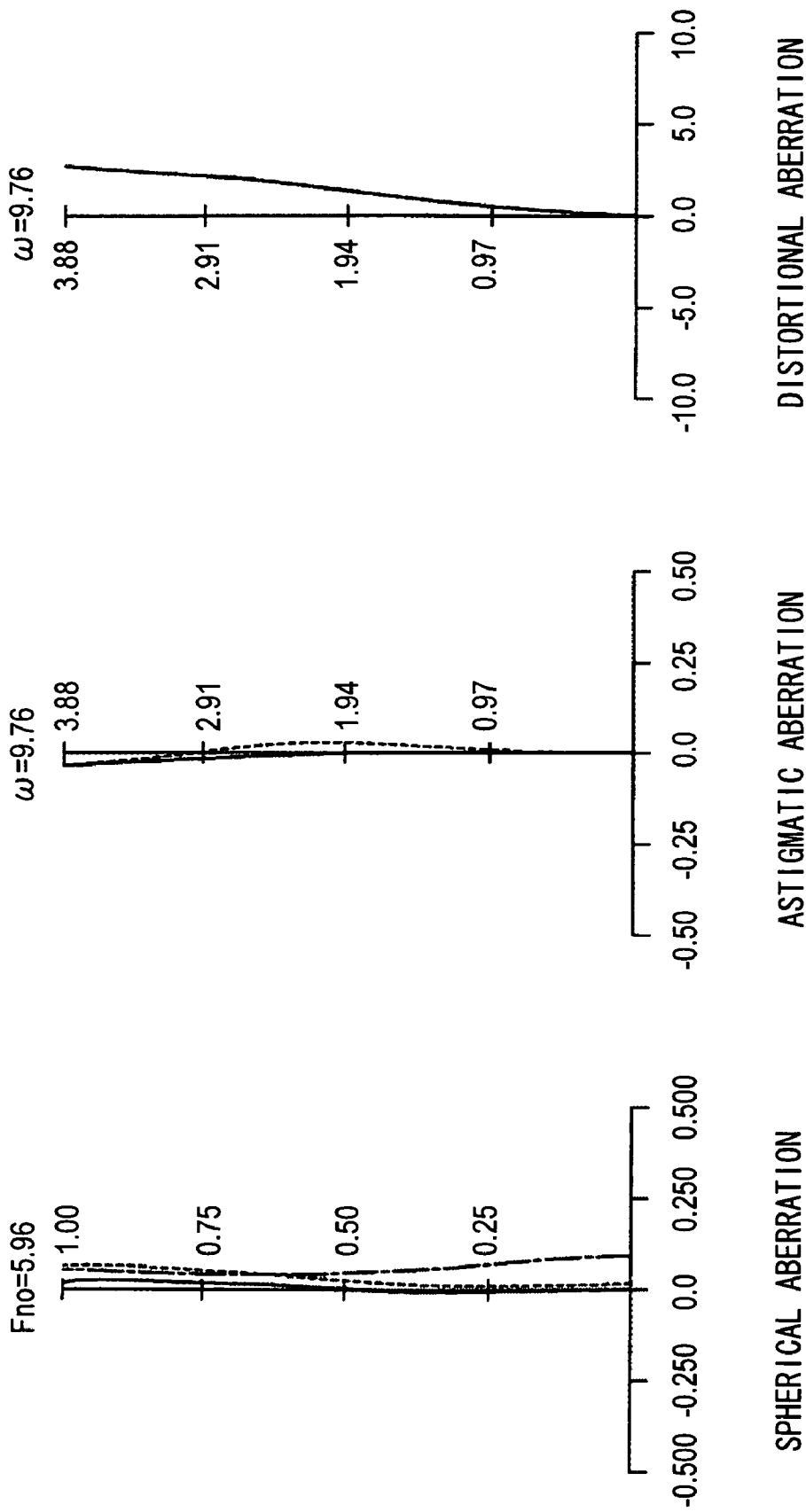
FIG. 24 shows a spherical aberration, an astigmatic aberration, and a distortional aberration observed when the lens of the sixth embodiment is set at a telephoto end.

FIGS. 22 to 24 show various aberrations encountered when the lens having numerical values of Example 6 is focused at infinity. FIG. 22 shows aberrations encountered when the lens is set at the wide angle end (at the focal length f of 5.1). FIG. 23 shows aberrations encountered when the lens is set at the intermediate focal length (at the focal length f of 10.58). FIG. 24 shows aberrations encountered when the lens is set at the telephoto end (at the focal length f of 21.93).

In the spherical aberration diagrams shown in FIGS. 22 to 24, solid lines represent values measured using a d-ray (having a wavelength of 587.6 nm); dotted lines represent values measured using a c-ray (having a wavelength of 656.3 nm); and chain lines represent values measured using a g-ray (having a wavelength of 435.8 nm). In the astigmatic aberration diagrams shown in FIGS. 22 to 24, solid lines represent values measured on a sagittal plane, and broken lines represent values measured on a meridional plane.

It is obvious from the aberration diagrams that aberrations can be satisfactorily corrected to achieve high imaging performance by the numerical values of Example 6.

Table 19 shows values of the zoom lenses 1 to 6 to be applied to Conditional Expressions (1) to (6), i.e., values to be substituted for "nd12" in Conditional Expression (1), "vd12" in Conditional Expression (2), "f12", "f1", and "|f12/f1|" in Conditional Expression (3), "D1", "fw", and "D1/fw" in Conditional Expression (4), "r21", "r12", and "(r21−r12)/(r12+r21)" in Conditional Expression (5), and "Sg21", "Sg12", "f(AIR)", and "{(|Sg21|+|Sg12|)×100}/|f(AIR)|" in Conditional Expression (6).

TABLE 19

| Expression | Values | Zoom Lens 1 | Zoom Lens 2 | Zoom Lens 3 | Zoom Lens 4 | Zoom Lens 5 | Zoom Lens 6 |
|---|---|---|---|---|---|---|---|
| (1) | nd12 | 2.00178 | 2.00178 | 2.00170 | 2.00178 | 2.00178 | 2.00178 |
| (2) | vd12 | 19.300 | 19.300 | 20.644 | 19.300 | 19.300 | 19.300 |
| | f12 | 21.07 | 17.95 | 13.98 | 18.89 | 19.19 | 18.53 |
| | f1 | −12.22 | −10.67 | −10.46 | −10.89 | −11.75 | −14.10 |
| (3) | \|f12/f1\| | 1.72 | 1.68 | 1.34 | 1.74 | 1.63 | 1.31 |
| | D1 | 4.56 | 4.75 | 4.50 | 5.50 | 4.35 | 3.97 |
| | fw | 4.08 | 4.08 | 3.71 | 3.71 | 4.41 | 5.1 |
| (4) | D1/fw | 1.12 | 1.16 | 1.21 | 1.48 | 0.99 | 0.78 |
| | r21 | 9.028 | 9.137 | 7.316 | 10.253 | 9.137 | 11.506 |
| | r12 | 5.025 | 5.101 | 6.371 | 5.430 | 5.314 | 6.216 |
| (5) | (r21 − r12)/(r12 + r21) | 0.28 | 0.28 | 0.07 | 0.31 | 0.26 | 0.30 |
| | Sg21 | 0.067 | 0.059 | −0.485 | −0.126 | 0.051 | 0.061 |
| | Sg12 | −1.192 | −1.875 | 0.258 | −0.860 | −0.834 | −0.538 |
| | f(AIR) | −109.70 | −102.48 | 59.80 | −95.60 | −110.20 | −67.62 |
| (6) | {(\|Sg21\| + \|Sg12\|) × 100}/\|f(AIR)\| | 1.15 | 1.89 | 1.24 | 1.03 | 0.80 | 0.89 |

As will be apparent from Table 19, the zoom lenses 1 to 6 satisfy Conditional Expressions (1) to (6).

An imaging apparatus according to one embodiment of the invention will now be described.

The imaging apparatus according to this embodiment of the invention is an imaging apparatus which includes a zoom lens and an imaging element converting an optical image formed by the zoom lens into an electrical signal.

The zoom lens provided in the imaging apparatus according to the embodiment of the invention includes a first lens group having negative refracting power, a second lens group having positive refracting power, and a third lens group having positive refracting power which are disposed in the order listed from an object side to an image side.

During zooming from the wide angle end to the telephoto end, the first lens group of the zoom lens is moved in a direction along the optical axis thereof and the second lens group is moved along the optical axis thereof toward the object such that an air space between the first lens group and the second lens group decreases and such that an air space between the second lens group and the third lens group increases.

The first lens group includes a first lens and a second lens disposed in the order listed from the object side to the image side. The first lens is a positive lens which is aspherically shaped on both sides thereof and which includes a concave surface facing the image. The second lens is a positive meniscus lens which is aspherically shaped on at least a side thereof facing the object and which includes a convex surface facing the object.

The zoom lens provided in the imaging apparatus according to the embodiment of the invention is configured to satisfy the following Conditional Expressions (1) and (2)

$$nd12 > 2.0 \quad (1)$$

$$vd12 < 21.6 \quad (2)$$

wherein nd12 represents the refractive index of the second lens in the first lens group measured using a d-ray, and vd12 represents the Abbe number of the second lens in the first lens group measured using a d-ray.

In the imaging apparatus of according to the embodiment of the invention, the first lens that is a negative lens included in the first lens group is aspherically shaped on both sides thereof. It is therefore possible to correct negative distortional aberrations and field curvature which can become noticeable at the wide angle end of the lens when the lens has a great angle of view.

The second lens of the first lens group that is a positive meniscus lens is aspherically shaped on at least a side thereof facing the object. It is therefore possible to correct distortional aberrations and astigmatic aberrations at the wide angle end which can not be completely corrected by the first lens, in a well-balanced manner. Since the second lens of the first lens group that is a positive meniscus lens is aspherically shaped at least on a side thereof facing the object, it is possible to satisfactorily correct spherical aberrations occurring at the telephoto end of the lens when the lens has a great zoom ratio.

Thus, the imaging apparatus of the present embodiment can be provided with a small size and high optical performance including a great angle of view and a great zoom ratio because the first lens group is formed by two lenses and because both sides of the first lens and at least one side of the second lens facing the object are aspherically shaped.

Especially, when the imaging apparatus according to the embodiment of the invention is a retractable imaging apparatus having an expandable lens barrel, the zoom lens allows the imaging apparatus to have a small overall length when the apparatus is retracted.

Conditional Expressions (1) and (2) are conditional expressions defining the refractive index and Abbe number of the second lens which is a positive lens forming part of the first lens group.

When the range defined by Conditional Expression (1) is exceeded, it is desirable to increase the curvature of the second lens. Otherwise, degradation of optical performance may be caused by difficulty in correcting field curvature at the wide angle end, and difficulty will be encountered in manufacturing a lens barrel because of difficulty in maintaining a sufficient edge thickness.

When the range defined by Conditional Expression (2) is exceeded, it is difficult to correct chromatic aberrations occurring at the first lens group, which results in degradation of optical performance.

Therefore, when the zoom lens satisfies Conditional Expressions (1) and (2), the imaging apparatus of the present embodiment can be provided with improved optical performance, and the lens barrel can be manufactured with ease.

Figure 25:
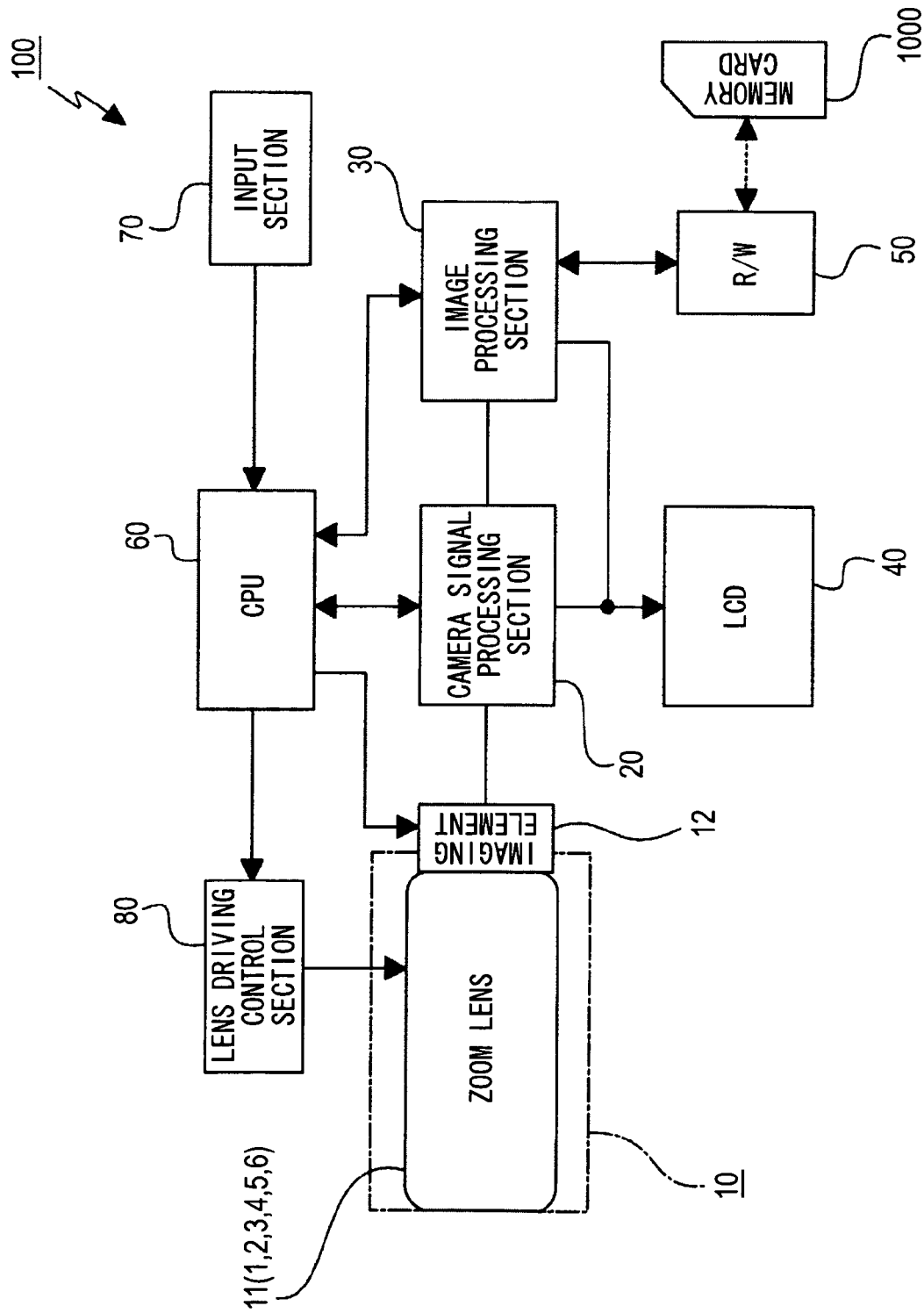
FIG. 25 is a block diagram of an embodiment of an imaging apparatus according to the invention.

FIG. 25 is a block diagram of a digital still camera that is an embodiment of the image apparatus according to the present embodiment.

An imaging apparatus (digital still camera) 100 includes a camera block 10 having an imaging function, a camera signal processing section 20 performing signal processing such as analog-to-digital conversion of an image signal obtained as a result of imaging, an image processing section 30 performing processes of recording and reproducing an image signal, an LCD (liquid crystal display) 40 displaying an image obtained as a result of imaging, a reader/writer 50 reading and writing an image signal in and from a memory card 1000, a CPU (central processing unit) 60 controlling the imaging apparatus as a whole, an input section 70 including various switches which are operated by a user as occasion demands, and a lens driving control section 80 for controlling driving of lenses provided in the camera block 10.

The camera block 10 is formed by an optical system including a zoom lens 11 (which includes lenses 1, 2, 3, 4, 5, and 6 according to the embodiment of the invention) and an imaging element 12 such as a CCD (change coupled device) or CMOS (complementary metal oxide semiconductor).

The camera signal processing section 20 performs various types of signal processing such as conversion of an output signal from the imaging element 12 into a digital signal, noise elimination, corrections for improved image quality, conversion into a luminance signal or a color difference signal.

The image processing section 30 performs processes of compressing or coding and decompressing or decoding an image signal based on a predetermined image data format and processes for converting data specifications such as resolution.

The LCD 40 has the function of displaying various types of data such as states of operation of a user on the input section 70 and images obtained as a result of imaging.

The reader/writer 50 writes image data coded by the image processing section 30 in the memory card 1000 and reads image data recorded in the memory card 1000.

The CPU 60 functions as a control process section for controlling circuit blocks provided in the imaging apparatus 100, and the CPU controls the circuit blocks based on instruction input signals from the input section 70.

The input section 70 includes, for example, a shutter release button for operating a shutter and select switches for selecting operation modes, and the section outputs instruction input signals to the CPU 60 according to operations of the user.

The lens driving control section 80 controls motors, which are not shown, for driving the lenses of the zoom lens 11 based on control signals from the CPU 60.

For example, the memory card 1000 is a semiconductor memory which can be inserted and removed in and from a slot connected to the reader/writer 50.

Operations of the imaging apparatus 100 will now be described.

In an imaging standby state, an image signal obtained by the camera block 10 is output to the LCD 40 through the camera signal processing section 20 under control exercised by the CPU 60, and the signal is displayed as a camera-through image. When an instruction input signal for zooming is input from the input section 70, the CPU 60 outputs a control signal to the lens driving control section 80, and predetermined lenses of the zoom lens 11 are moved under control exercised by the lens driving control section 80.

When a shutter (not shown) included in the camera block 10 is operated according to an instruction input signal from the input section 70, the image signal obtained as thus described is output from the camera signal processing section 20 to the image processing section 30 to be compressed or coded, and the signal is thus converted into a digital data in a predetermined data format. The converted signal is output to the reader/writer 50 and written in the memory card 1000.

For example, when the shutter release button of the input section 70 is pressed halfway or pressed fully for recording (imaging), the lens driving control section 80 causes focusing of the zoom lens 11 by moving predetermined lenses thereof based on a control signal from the CPU 60.

When image data recorded in the memory card 1000 is to be reproduced, the predetermined image data is read from the memory card 1000 by the reader/writer 50 according to an operation performed on the input section 70. The decompressing or decoding process is performed on the data by the image processing section 30, and a reproduced image signal is thereafter output to the LCD 40 to display the reproduced image.

The above-described embodiment is an example of the use of the imaging apparatus as a digital still camera. The application of the imaging apparatus is not limited to digital still cameras, and the imaging apparatus has a wide range of applications including digital video cameras, portable telephones having a built-in camera, and camera units of digital input/output apparatus such as PDAs (personal digital assistants) having a built-in camera.

All of the shapes and numerical values of the elements shown in the above-described embodiments are merely examples of specific forms for carrying out the invention, and they should not be taken as limitations to the technical scope of the invention.

The present application contains subject matter related to that disclosed in Japanese Priority Patent Application JP 2008-298523 filed in the Japan Patent Office on Nov. 21, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
a first lens group having negative refracting power;
a second lens group having positive refracting power; and
a third lens group having positive refracting power, disposed in the order listed from an object side to an image side, wherein
during zooming from a wide angle end to a telephoto end, the first lens group is moved and the second lens group is moved toward the object such that an air space between the first lens group and the second lens group decreases and such that an air space between the second lens group and the third lens group increases; and
the first lens group is formed by a first lens which is a negative lens aspherically shaped on both sides thereof and having a concave surface facing the object and a second lens which is a positive meniscus lens aspherically shaped on at least a side thereof facing the object and having a convex surface facing the object, the first and second lenses being disposed in the order listed from the object side to the image side,
the zoom lens satisfying the following Conditional Expressions (1) and (2)

$$nd12 > 2.0 \quad (1)$$

$$vd12 < 21.6 \quad (2)$$

wherein nd12 represents the refractive index of the second lens of the first lens group measured using a d-ray, and vd12 represents the Abbe number of the second lens of the first lens group measured using a d-ray.

2. A zoom lens according to claim 1, the zoom lens satisfying the following Conditional Expressions (3) and (4)

$$1.0 < |f12/f1| < 2.0 \quad (3)$$

$$0.6 < D1/fw < 1.5 \quad (4)$$

wherein f12 represents the focal length of the second lens of the first lens group; f1 represents the focal length of the first lens group; D1 represents the thickness of the first lens group measured on the optical axis thereof; and fw represents the focal length of the entire lens system at the wide angle end.

3. A zoom lens according to claim 1, the zoom lens satisfying the following Conditional Expressions (5) and (6)

$$0.05 < (r21 - r12)/(r12 + r21) < 0.35 \quad (5)$$

$$0.55 < \{(|Sg21| + Sg12|) \times 100\}/|f(\text{AIR})| < 2.0 \quad (6)$$

wherein r21 represents a near-axis radius of curvature of the object-facing surface of the second lens in the first lens group; r12 represents a near-axis radius of curvature of the image-facing surface of the first lens in the first lens group; f(AIR) represents the focal length of an air lens formed between the first lens and the second lens in the first lens group; f(Δsag) represents the sag of the near-axis radius of curvature minus the sag of the aspheric shape; Sg21 represents the value f(Δsag) measured in the position of the effective aperture of the object-facing surface of the second lens in the first lens group; and Sg12 represents the value f(Δsag) measured in the position of the effective aperture of the image-facing surface of the first lens in the first lens group, provided that, when the position of the effective aperture of the image-facing surface of the first lens is further than the radius r12, Sg12 represents the value f(Δsag) measured at the radial distance r12 from the optical axis of the lens.

4. A zoom lens according to claim 1, wherein the second lens group includes a third lens and a cemented lens disposed in the order listed from the object side to the image side, the third lens being a positive lens which is aspherically shaped on at least a side thereof facing the object and which has a convex surface facing the object and the cemented lens being formed by bonding a fourth lens which is a positive lens having a convex surface facing the object and a fifth lens which is a negative lens having a concave surface facing the image.

5. A zoom lens according to claim 1, having the function of correcting image blur by shifting the second lens group in a direction perpendicular to the optical axis thereof.

6. An imaging apparatus comprising:
a zoom lens; and
an imaging element converting an optical image formed by the zoom lens into an electrical signal, wherein
the zoom lens includes a first lens group having negative refracting power, a second lens group having positive refracting power, and a third lens group having positive refracting power, disposed in the order listed from an a side where an object is located to a side where an image is located,
during zooming from a wide angle end to a telephoto end, the first lens group is moved and the second lens group is moved toward the object such that an air space between the first lens group and the second lens group decreases and such that an air space between the second lens group and the third lens group increases, and
the first lens group is formed by a first lens which is a negative lens aspherically shaped on both sides thereof and having a concave surface facing the object and a second lens which is a positive meniscus lens aspherically shaped on at least a side thereof facing the object and having a convex surface facing the object, the first and second lenses being disposed in the order listed from the object side to the image side,
the imaging apparatus satisfying the following Conditional Expressions (1) and (2)

$$nd12 > 2.0 \quad (1)$$

$$vd12 < 21.6 \quad (2)$$

wherein nd12 represents the refractive index of the second lens of the first lens group measured using a d-ray, and vd12 represents the Abbe number of the second lens of the first lens group measured using a d-ray.

* * * * *